United States Patent
Dams et al.

(10) Patent No.: US 8,476,385 B2
(45) Date of Patent: Jul. 2, 2013

(54) FLUORINATED ETHER COMPOSITIONS AND METHODS OF USING THE SAME

(75) Inventors: Rudolf J. Dams, Antwerp (BE); Miguel A. Guerra, Woodbury, MN (US); Klaus Hintzer, Kastl (DE); Michael Jürgens, Neuoetting (DE); Harald Kaspar, Burgkirchen (DE); Kai H. Lochhaas, Neuoetting (DE); Andreas R. Maurer, Langenneufnach (DE); Zai-Ming Qiu, Woodbury, MN (US); Werner Schwertfeger, Langgons (DE); Michael S. Terrazas, Prescott, WI (US); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 342 days.

(21) Appl. No.: 12/602,877

(22) PCT Filed: Jun. 6, 2008

(86) PCT No.: PCT/US2008/066048
§ 371 (c)(1),
(2), (4) Date: Dec. 3, 2009

(87) PCT Pub. No.: WO2008/154345
PCT Pub. Date: Dec. 18, 2008

(65) Prior Publication Data
US 2010/0179262 A1 Jul. 15, 2010

Related U.S. Application Data

(60) Provisional application No. 60/942,402, filed on Jun. 6, 2007.

(51) Int. Cl.
C08F 18/20 (2006.01)
(52) U.S. Cl.
USPC ............ 526/246; 526/245; 526/247; 526/248
(58) Field of Classification Search
USPC .................. 526/245, 246, 247, 248; 560/161, 560/165, 166, 167; 570/126, 136; 568/615, 568/616, 677, 685
See application file for complete search history.

(56) References Cited

U.S. PATENT DOCUMENTS

| | | | |
|---|---|---|---|
| 2,713,593 A | 7/1955 | Brice et al. | |
| 2,803,615 A | 8/1957 | Ahlbrecht | |
| 2,826,564 A * | 3/1958 | Bovey et al. | 526/246 |
| 3,250,808 A | 5/1966 | Moore, Jr. et al. | |
| 3,271,341 A | 9/1966 | Garrison | |
| 3,274,244 A | 9/1966 | Mackenzie | |
| 3,278,352 A | 10/1966 | Erickson | |
| 3,306,855 A | 2/1967 | Borecki | |
| 3,391,099 A | 7/1968 | Punderson | |
| 3,451,908 A | 6/1969 | Sianesi et al. | |
| 3,492,374 A | 1/1970 | Le Bleu | |
| 3,536,710 A | 10/1970 | Bartlett | |
| 3,553,179 A | 1/1971 | Bartlett | |
| 3,555,089 A | 1/1971 | Bartlett | |
| 3,555,100 A | 1/1971 | Garth et al. | |
| 3,589,906 A | 6/1971 | McDowell | |
| 3,621,059 A | 11/1971 | Bartlett | |
| 3,644,492 A | 2/1972 | Bartlett | |
| 3,646,085 A | 2/1972 | Bartlett | |
| 3,721,696 A | 3/1973 | Sianesi et al. | |
| 3,787,351 A | 1/1974 | Olson | |
| 3,798,265 A | 3/1974 | Bartlett | |
| 3,810,874 A | 5/1974 | Mitsch et al. | |
| 3,814,741 A * | 6/1974 | Caporiccio et al. | |

(Continued)

FOREIGN PATENT DOCUMENTS

| | | |
|---|---|---|
| CA | 761007 | 6/1967 |
| DE | 3 828 063 | 2/1990 |

(Continued)

OTHER PUBLICATIONS

"Esterification: Acrylate Esters", Rohm and Haas, http://www.amberlyst.com/acrylate.htm. Feb. 20, 2013.*
England, "Catalytic Conversion of Fluoroalkyl Alkyl Ethers to Carbonyl Compounds", J. Org. Chem., 1984, vol. 49, pp. 4007-4008.
Chi et al., "A Facile Synthesis of Partly-fluorinated Ethers Using Perfluoroporpoxyethylene and Aliphatic Alcohols", Bull. Korean Chem. Soc., 1999, vol. 20, No. 2, pp. 220-222.

(Continued)

Primary Examiner — Nicole M Buie-Hatcher

(57) ABSTRACT

A composition including at least one first divalent unit represented by formula: Each Rf is independently selected from the group consisting of $Rf^a$—$(O)_t$—CHF—$(CF_2)_n$—; [$Rf_a$—$(O)_t$—C(L)H—$CF_2$—O]$_m$—W—; $Rf^b$—O—$(CF_2)_{p^-}$; $F(C_kF_{2k})$—$(O$—$C_kF2_k)_P$—O—$CF_2$—; and $CF_3$—O—$(CF_2)_3$—$(OCF(CF_3)$—$CF_2)_Z$—O—$L^1$-. Each Q is independently selected from the group consisting of a bond, —C(O)—$N(R^1)$—, and —C(O)—O—. Each X is independently selected from the group consisting of alkylene and arylalkylene, wherein alkylene and arylalkylene are each optionally interrupted by at least one ether linkage and optionally terminated by —$N(R^1)$—C(O)— or —O—C(O)—. R and $R^1$ are each independently selected from the group consisting of hydrogen and alkyl having from 1 to 4 carbon atoms. $Rf^a$ represents a partially or fully fluorinated alkyl group having from 1 to 10 carbon atoms and optionally interrupted with at least one oxygen atom. $Rf^b$ is selected from the group consisting of $CF_3CFH$— and $F(C_jF_{2j})$-. Methods of reducing surface tension of a liquid, making foams, and treating a surface using the compositions are also disclosed.

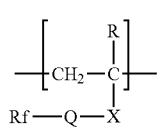

(I)

20 Claims, No Drawings

U.S. PATENT DOCUMENTS

| | | |
|---|---|---|
| 3,839,425 A | 10/1974 | Bartlett |
| 3,927,072 A | 12/1975 | Fox |
| 3,944,527 A * | 3/1976 | McCown ..................... 526/243 |
| 3,944,610 A | 3/1976 | Caporiccio |
| 4,025,709 A | 5/1977 | Blaise et al. |
| 4,085,137 A | 4/1978 | Mitsch |
| 4,089,804 A | 5/1978 | Falk |
| 4,292,402 A | 9/1981 | Pollet et al. |
| 4,380,618 A | 4/1983 | Khan et al. |
| 4,381,384 A | 4/1983 | Khan |
| 4,544,458 A | 10/1985 | Grot et al. |
| 4,588,796 A | 5/1986 | Wheland |
| 4,621,116 A | 11/1986 | Morgan |
| 4,766,190 A | 8/1988 | Morita et al. |
| 4,789,717 A | 12/1988 | Giannetti et al. |
| 4,832,879 A | 5/1989 | Hamprecht |
| 4,859,754 A | 8/1989 | Maekawa et al. |
| 4,861,845 A | 8/1989 | Slocum et al. |
| 4,864,006 A | 9/1989 | Giannetti et al. |
| 4,987,254 A | 1/1991 | Schwertfeger et al. |
| 5,043,464 A | 8/1991 | Yamamoto |
| 5,130,477 A | 7/1992 | Koike et al. |
| 5,132,446 A | 7/1992 | Tohzuka et al. |
| 5,153,322 A | 10/1992 | Flynn |
| 5,162,469 A * | 11/1992 | Chen ..................... 526/245 |
| 5,256,318 A | 10/1993 | Masutani et al. |
| 5,270,378 A * | 12/1993 | Johnson et al. ................ 524/520 |
| 5,285,002 A | 2/1994 | Grootaert |
| 5,350,497 A | 9/1994 | Hung et al. |
| 5,395,657 A | 3/1995 | Strepparola et al. |
| 5,399,718 A | 3/1995 | Costello et al. |
| 5,414,102 A | 5/1995 | Pohmer et al. |
| 5,424,474 A | 6/1995 | Pohmer et al. |
| 5,447,982 A | 9/1995 | Kamba et al. |
| 5,453,539 A | 9/1995 | Kondo et al. |
| 5,488,142 A | 1/1996 | Fall et al. |
| 5,498,680 A | 3/1996 | Abusleme et al. |
| 5,502,251 A | 3/1996 | Pohmer et al. |
| 5,516,578 A | 5/1996 | Coppens |
| 5,532,310 A | 7/1996 | Grenfell et al. |
| 5,536,425 A | 7/1996 | Kondo |
| 5,550,277 A | 8/1996 | Paciorek et al. |
| 5,608,022 A | 3/1997 | Nakayama et al. |
| 5,656,201 A | 8/1997 | Visca et al. |
| 5,660,888 A * | 8/1997 | Grenfell et al. ............ 427/385.5 |
| 5,663,255 A | 9/1997 | Anolick et al. |
| 5,688,884 A | 11/1997 | Baker et al. |
| 5,710,345 A | 1/1998 | Navarrini |
| 5,763,552 A | 6/1998 | Feiring et al. |
| 5,789,508 A | 8/1998 | Baker et al. |
| 5,804,650 A | 9/1998 | Tsuda et al. |
| 5,955,556 A | 9/1999 | McCarthy et al. |
| 5,959,026 A | 9/1999 | Abusleme et al. |
| 5,965,659 A | 10/1999 | Kubo et al. |
| 5,969,063 A | 10/1999 | Parker et al. |
| 6,013,712 A | 1/2000 | Chittofrati et al. |
| 6,013,795 A | 1/2000 | Manzara et al. |
| 6,025,307 A | 2/2000 | Chittofrati et al. |
| 6,103,843 A | 8/2000 | Abusleme et al. |
| 6,126,849 A | 10/2000 | Yamana et al. |
| 6,127,498 A | 10/2000 | Tonelli et al. |
| 6,180,826 B1 | 1/2001 | Szonyi |
| 6,184,187 B1 | 2/2001 | Howell et al. |
| 6,207,777 B1 | 3/2001 | Shimada et al. |
| 6,255,536 B1 | 7/2001 | Worm et al. |
| 6,297,334 B1 | 10/2001 | Marchese et al. |
| 6,395,848 B1 | 5/2002 | Morgan et al. |
| 6,410,626 B1 | 6/2002 | Wada et al. |
| 6,429,258 B1 | 8/2002 | Morgan et al. |
| 6,452,038 B1 | 9/2002 | Rao et al. |
| 6,479,605 B1 * | 11/2002 | Franchina ..................... 526/245 |
| 6,482,979 B1 | 11/2002 | Hintzer et al. |
| 6,512,063 B2 | 1/2003 | Tang |
| 6,566,470 B2 | 5/2003 | Kantamneni et al. |
| 6,576,703 B2 | 6/2003 | Kapeliouchko et al. |
| 6,602,968 B1 | 8/2003 | Bekiarian et al. |
| 6,610,788 B1 | 8/2003 | Takakura et al. |
| 6,613,860 B1 | 9/2003 | Dams et al. |
| 6,624,268 B1 | 9/2003 | Maekawa et al. |
| 6,632,508 B1 | 10/2003 | Pellerite et al. |
| 6,642,307 B1 | 11/2003 | Sogabe et al. |
| 6,646,088 B2 | 11/2003 | Fan et al. |
| 6,656,258 B2 | 12/2003 | Elsbernd et al. |
| 6,660,798 B1 | 12/2003 | Marchese et al. |
| 6,664,354 B2 | 12/2003 | Savu |
| 6,677,414 B2 | 1/2004 | Hintzer et al. |
| 6,689,854 B2 | 2/2004 | Fan et al. |
| 6,693,152 B2 | 2/2004 | Kaspar et al. |
| 6,703,520 B2 | 3/2004 | Hintzer et al. |
| 6,716,534 B2 | 4/2004 | Moore et al. |
| 6,730,760 B2 | 5/2004 | Grootaert et al. |
| 6,737,489 B2 | 5/2004 | Linert et al. |
| 6,750,304 B2 | 6/2004 | Kaspar et al. |
| 6,774,164 B2 | 8/2004 | Lyons et al. |
| 6,815,040 B2 | 11/2004 | Pellerite et al. |
| 6,822,059 B2 | 11/2004 | Buckanin et al. |
| 6,833,418 B2 | 12/2004 | Tan et al. |
| 6,872,324 B2 | 3/2005 | Maekawa |
| 6,878,772 B2 | 4/2005 | Visca et al. |
| 6,923,921 B2 | 8/2005 | Flynn et al. |
| 7,041,728 B2 | 5/2006 | Zipplies et al. |
| 7,045,571 B2 | 5/2006 | Tan et al. |
| 7,053,146 B2 | 5/2006 | Morschhäuser |
| 7,064,170 B2 | 6/2006 | Kaspar et al. |
| 7,074,862 B2 | 7/2006 | Kaspar et al. |
| 7,094,829 B2 | 8/2006 | Audenaert et al. |
| 7,097,910 B2 | 8/2006 | Moore et al. |
| 7,122,608 B1 | 10/2006 | Brinati et al. |
| 7,125,941 B2 | 10/2006 | Kaulbach et al. |
| 7,126,016 B2 | 10/2006 | Fu et al. |
| 7,141,537 B2 | 11/2006 | Audenaert et al. |
| 7,214,736 B2 | 5/2007 | Audenaert et al. |
| 7,279,522 B2 | 10/2007 | Dadalas et al. |
| 7,297,744 B2 | 11/2007 | Kapeliouchko et al. |
| 7,342,066 B2 | 3/2008 | Dadalas et al. |
| 7,351,342 B2 | 4/2008 | Funaki et al. |
| 7,425,279 B2 | 9/2008 | Coté et al. |
| 7,566,762 B2 | 7/2009 | Otsuka et al. |
| 7,659,333 B2 | 2/2010 | Hintzer et al. |
| 7,671,112 B2 | 3/2010 | Hintzer et al. |
| 7,678,426 B2 | 3/2010 | Flynn et al. |
| 7,682,771 B2 | 3/2010 | Liu et al. |
| 7,696,268 B2 | 4/2010 | Tsuda |
| 7,745,653 B2 | 6/2010 | Iyer et al. |
| 7,754,795 B2 | 7/2010 | Hintzer et al. |
| 7,776,946 B2 | 8/2010 | Hintzer et al. |
| 7,795,375 B2 | 9/2010 | Shirakawa et al. |
| 7,803,894 B2 | 9/2010 | Dams et al. |
| 7,838,608 B2 | 11/2010 | Hintzer et al. |
| 8,002,886 B2 | 8/2011 | Clark |
| 2002/0091212 A1 | 7/2002 | Abusleme et al. |
| 2003/0224112 A1 | 12/2003 | Dams |
| 2004/0010156 A1 | 1/2004 | Kondo et al. |
| 2004/0077237 A1 | 4/2004 | Audenaert et al. |
| 2004/0082745 A1 * | 4/2004 | Kantamneni et al. ......... 526/245 |
| 2004/0116742 A1 | 6/2004 | Guerra |
| 2004/0242755 A1 | 12/2004 | Araki et al. |
| 2005/0027063 A1 | 2/2005 | Audenaert |
| 2005/0090613 A1 | 4/2005 | Maruya et al. |
| 2005/0154104 A1 | 7/2005 | Malvasi et al. |
| 2005/0228127 A1 | 10/2005 | Tatemoto et al. |
| 2006/0045129 A1 | 3/2006 | Dams |
| 2006/0199029 A1 * | 9/2006 | Liu et al. ..................... 428/500 |
| 2006/0281946 A1 | 12/2006 | Morita et al. |
| 2007/0004848 A1 | 1/2007 | Hintzer et al. |
| 2007/0015865 A1 | 1/2007 | Hintzer et al. |
| 2007/0117915 A1 | 5/2007 | Funaki et al. |
| 2007/0155891 A1 | 7/2007 | Tsuda et al. |
| 2007/0197717 A1 | 8/2007 | Ueda et al. |
| 2007/0276103 A1 | 11/2007 | Guerra et al. |
| 2008/0015304 A1 | 1/2008 | Hintzer et al. |
| 2008/0015319 A1 | 1/2008 | Hintzer et al. |
| 2009/0149616 A1 | 6/2009 | Audenaert et al. |
| 2010/0168300 A1 | 7/2010 | Dams et al. |
| 2010/0183889 A1 | 7/2010 | Dams |

| | | | |
|---|---|---|---|
| 2011/0124532 A1 | 5/2011 | Maurer et al. | |
| 2011/0124782 A1 | 5/2011 | Dams et al. | |
| 2011/0247822 A1 | 10/2011 | Dams | |

FOREIGN PATENT DOCUMENTS

| | | |
|---|---|---|
| EP | 0 525 660 | 2/1993 |
| EP | 0 625 526 A1 | 11/1994 |
| EP | 0 712 882 | 5/1996 |
| GB | 1 194 431 | 6/1970 |
| GB | 1 352 560 | 5/1974 |
| JP | 61-285426 | 12/1986 |
| JP | 2002-308914 | 10/2002 |
| JP | 2002-317003 | 10/2002 |
| JP | 2003-027079 | 1/2003 |
| JP | 2003-043625 | 2/2003 |
| JP | 2003-119204 | 4/2003 |
| JP | 2003-212919 | 7/2003 |
| JP | 2004-018394 | 1/2004 |
| JP | 2004-358397 | 12/2004 |
| JP | 2004-359870 | 12/2004 |
| JP | 2007-106958 | 4/2007 |
| WO | WO 9700230 A1 * | 1/1997 |
| WO | WO 98/50603 | 11/1998 |
| WO | WO 02/20676 | 3/2002 |
| WO | WO 02/44230 | 6/2002 |
| WO | WO 2005/063827 | 7/2005 |
| WO | WO 2005/065800 | 7/2005 |
| WO | WO 2005/092520 | 10/2005 |
| WO | WO 2005/121290 | 12/2005 |
| WO | WO 2005/123646 | 12/2005 |
| WO | WO 2006/071981 | 7/2006 |

OTHER PUBLICATIONS

"Synthesis of Perfluoroalkyl Vinyl Ether Acids and Derivatives," Perfluoroalkyl Vinyl Ether Acids. Raymond Sullivan, vol. 34, No. 6, Jun. 1969, p. 1841-1844.

Karsa, "Industrial Applications of Surfactants", The Proceedings of a Symposium organized by the North West Region of the Industrial Division of the Royal Society of Chemistry, The Royal Society of Chemistry, Burlington House, London, 2 pages.

Rosen, "Surfactants and Interfacial Phenomena", John Wiley & Sons, NY, ix-xiv (1978).

Tonelli, "Linear Perfluoropolyether Difunctional Oligomers: Chemistry, Properties and Applications", J. Fluorine Chem., 1999, vol. 95, pp. 51-70.

International Search Report from PCT/US2008/066048; 3 pgs.

* cited by examiner

FLUORINATED ETHER COMPOSITIONS AND METHODS OF USING THE SAME

Cross Reference to Related Applications

This application is a national stage filing under 35 U.S.C. §371 of PCT/US2008/066048, filed Jun. 6, 2008, which claims priority to U.S. Provisional Application No. 60/942,402, filed Jun. 6, 2007, the disclosure of which is incorporated by reference in its entirety herein.

BACKGROUND

Fluorochemicals have been used in a variety of applications for many years. For example, fluorinated surfactants have been added to a variety of formulations (e.g., coatings and foams). The addition of a fluorinated surfactant to a formulation (e.g., a coating formulation) may enhance the properties of the formulation by improving, for example, wetting behavior, leveling properties, and stability (e.g., with respect to phase separation or foam half-life). In other applications, fluorochemicals have been used to provide properties such as hydrophobicity and oleophobicity to various materials (e.g., ceramics, fabrics, and porous stones).

Traditionally, many widely used fluorinated surfactants include long-chain perfluoroalkyl groups, (e.g., perfluorooctyl groups). Recently, however, there has been an industry trend away from using perfluorooctyl fluorinated surfactants, which has resulted in a desire for new types of surfactants which may be used in a variety of applications.

SUMMARY

In one aspect, the present invention provides a composition comprising at least one first divalent unit represented by formula:

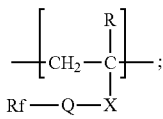

wherein
each Rf is independently selected from the group consisting of:

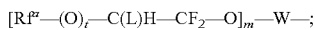

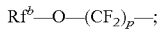

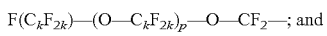

each Q is independently selected from the group consisting of a bond, —C(O)—N($R^1$)—, and —C(O)—O—;
each X is independently selected from the group consisting of alkylene and arylalkylene, wherein alkylene and arylalkylene are each optionally interrupted by at least one ether linkage and optionally terminated by —N($R^1$)—C(O)— or —O—C(O)—;
R and $R^1$ are each independently selected from the group consisting of hydrogen and alkyl having from 1 to 4 carbon atoms;

$Rf^a$ represents a partially or fully fluorinated alkyl group having from 1 to 10 carbon atoms and optionally interrupted with at least one oxygen atom;
$Rf^b$ is selected from the group consisting of $CF_3$CFH— and $F(C_jF_{2j})$—;
L is selected from the group consisting of F and $CF_3$;
W is selected from the group consisting of alkylene and arylene;
$L^1$ is selected from the group consisting of —$CF_2$—, —$CF_2CF_2$—, and —$CF(CF_3)$—;
t is 0 or 1, wherein when Rf is represented by formula $Rf^a$—(O)$_t$—CHF—($CF_2$)$_n$— and t is 0, then $Rf^a$ is interrupted with at least one oxygen atom;
m is 1, 2, or 3;
n is 0 or 1;
j is an integer from 1 to 4;
each k is independently 1 or 2;
each p is independently an integer from 1 to 6; and
z is an integer from 0 to 3.

In another aspect, the present invention provides a method of treating a surface, the method comprising contacting the surface with a composition according to the present invention. In some embodiments, the surface comprises at least one of ceramic (i.e., glasses, crystalline ceramics, glass ceramics, and combinations thereof), natural stone (e.g., sandstone, limestone, marble, and granite), or a cementicious surface (e.g., grout, concrete, and engineered stone).

In another aspect, the present invention provides an article having a surface, wherein at least a portion of the surface is in contact with a composition according to the present invention. In some embodiments, the surface comprises at least one of ceramic, natural stone, or a cementicious surface.

In another aspect, the present invention provides a method of reducing the surface tension of a liquid, the method comprising combining the liquid with an amount of a composition according to the present invention, wherein the amount of the composition is sufficient to reduce the surface tension of the liquid. In some embodiments, the surface tension of the liquid is reduced by at least 10% (in some embodiments, at least 20%, 30%, 40%, 50%, 60%, or even 70%).

In another aspect, the present invention provides methods of making a foam, the method comprising combining components comprising a liquid, a gas, and a composition according to the present invention to provide the foam. In some of these embodiments, the liquid is water. In some of these embodiments, the liquid is a hydrocarbon liquid.

In another aspect, the present invention provides an article having a surface, wherein at least a portion of the surface is in contact with a fluorinated siloxane, the fluorinated siloxane comprising at least one condensation product of a fluorinated silane comprising at least one divalent unit represented by formula:

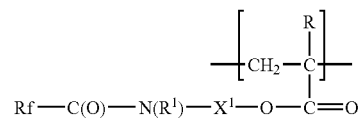

and at least one divalent unit represented by formula:

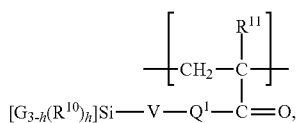

wherein
each Rf is independently selected from the group consisting of:

$Rf^a$—(O)$_t$—CHF—(CF$_2$)$_n$—;

[$Rf^a$—(O)$_t$—C(L)H—CF$_2$—O]$_m$—W—;

$Rf^b$—O—(CF$_2$)$_p$—;

F(C$_k$F$_{2k}$)—(O—C$_k$F$_{2k}$)$_p$—O—CF$_2$—; and

CF$_3$—O—(CF$_2$)$_3$—(OCF(CF$_3$)—CF$_2$)$_z$—O-L$^1$—;

$Rf^a$ represents a partially or fully fluorinated alkyl group having from 1 to 10 carbon atoms and optionally interrupted with at least one oxygen atom;
$Rf^b$ is selected from the group consisting of CF$_3$CFH— and F(C$_j$F$_{2j}$)—;
L is selected from the group consisting of F and CF$_3$;
W is selected from the group consisting of alkylene and arylene;
L$^1$ is selected from the group consisting of —CF$_2$—, —CF$_2$CF$_2$—, and —CF(CF3)-;
t is 0 or 1, wherein when Rf is represented by formula $Rf^a$—(O)$_t$—CHF—(CF$_2$)$_n$— and t is 0, then $Rf^a$ is interrupted with at least one oxygen atom;
m is 1, 2, or 3;
n is 0 or 1;
each j is independently an integer from 1 to 4;
each k is independently 1 or 2;
each p is independently an integer from 1 to 6;
z is an integer from 0 to 3;
X$^1$ is independently selected from the group consisting of alkylene and arylalkylene, and wherein alkylene and arylalkylene are each optionally interrupted by at least one ether linkage;
each R$^{10}$ is independently selected from the group consisting of alkyl having from 1 to 6 carbon atoms and aryl;
Q$^1$ is selected from the group consisting of —O—, —S—, and —N(R$^1$)—;
R, R$^1$, and R$^{11}$ are each independently selected from the group consisting of hydrogen and alkyl having from 1 to 4 carbon atoms;
V is alkylene that is optionally interrupted by at least one ether linkage or amine linkage;
each G is independently selected from the group consisting of hydroxyl, alkoxy, acyloxy, and halogen; and
h is 0, 1, or 2.

In some embodiments, compositions according to and/or used in the various aspects of the present invention, which are partially fluorinated and/or have a low (e.g., up to 4) number of continuous perfluorinated carbon atoms, surprisingly lower the surface tension of water to an extent comparable to fully fluorinated surfactants having a greater number of continuous perfluorinated carbon atoms. In some embodiments, compositions according to and/or used in the various aspects of the present invention, surprisingly raise the contact angle versus water and/or decane to an extent comparable to fully fluorinated surfactants having a greater number of continuous perfluorinated carbon atoms.

In this application:

The terms "a", "an", and "the" are used interchangeably with the term "at least one".

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

"Alkylene" is the divalent form of the "alkyl" groups defined above.

"Arylalkylene" refers to an "alkylene" moiety to which an aryl group is attached.

The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

In this application, all numerical ranges are inclusive of their endpoints unless otherwise stated.

DETAILED DESCRIPTION

Compositions according to the present invention comprise at least one (e.g., at least 1, 2, 5, 10, 15, 20, 25, or even at least 50) first divalent unit represented by Formula I:

Each Rf is independently selected from the group consisting of:

$Rf^a$—(O)$_t$—CHF—(CF$_2$)$_n$—      II;

[$Rf^a$—(O)$_t$—C(L)H—CF$_2$—O]$_m$—W—      III;

$Rf^b$—O—(CF$_2$)$_p$—      IV;

F(C$_k$F$_{2k}$)—(O—C$_k$F$_{2k}$)$_p$—O—CF$_2$—      V; and

CF$_3$—O—(CF$_2$)$_3$—(OCF(CF$_3$)—CF$_2$)$_z$—O-L$^1$-      VI.

In some embodiments of Formula I, Rf is selected from the group consisting of $Rf^a$—(O)$_t$—CHF—(CF$_2$)$_n$—, [$Rf^a$—(O)$_t$—C(L)H—CF$_2$—O]$_m$—W—, and CF$_3$CFH—O—(CF$_2$)$_p$—. In some embodiments of Formula I, Rf is selected from the group consisting of F(C$_j$F$_{2j}$)—O—(CF$_2$)$_p$—, F(C$_k$F$_{2k}$)—(O—C$_k$F$_{2k}$)$_p$—O—CF$_2$—, and CF$_3$—O—(CF$_2$)$_3$—(OCF(CF$_3$)—CF$_2$)$_z$O-L$^1$-.

In some embodiments of Formula I, Rf has a molecular weight of up to 600 grams per mole (in some embodiments, up to 500, 400, or even up to 300 grams per mole).

$Rf^a$ represents a partially or fully florinated alkyl group having from 1 to 10 carbon atoms and optionally interrupted with at least one oxygen atom. $Rf^a$ includes linear and branched alkyl groups. In some embodiments, $Rf^a$ is linear. In some embodiments, $Rf^a$ represents fully fluorinated alkyl group having up to 6 (in some embodiments, 5, 4, 3, 2, or 1) carbon atoms. In some embodiments, $Rf^a$ is a fully fluorinated alkyl group interrupted with at least one oxygen atom, of which the alkyl groups between oxygen atoms have up to 6 (in some embodiments, 5, 4, 3, 2, or 1) carbon atoms, and wherein the terminal alkyl group has up to 6 (in some embodiments, 5, 4, 3, 2, or 1) carbon atoms. In some embodiments, $Rf^a$ is a partially fluorinated alkyl group having up to 6 (in some embodiments, 5, 4, 3, 2, or 1) carbon atoms and up to 2 hydrogen atoms. In some embodiments, $Rf^a$ is a partially fluorinated alkyl group having up 2 hydrogen atoms interrupted with at least one oxygen atom, of which the alkyl groups between oxygen atoms have up to 6 (in some embodiments, 5, 4, 3, 2, or 1) carbon atoms, and wherein the terminal alkyl group has up to 6 (in some embodiments, 5, 4, 3, 2, or 1) carbon atoms.

In some embodiments of Formulas II and III, $Rf^a$ is represented by formula $$R_f^1-[OR_f^2]_x-[OR_f^3]_y-.$$

$R_f^1$ is a perfluorinated alkyl group having from 1 to 6 (in some embodiments, 1 to 4) carbon atoms. $R_f^2$ and $R_f^3$ are each independently perfluorinated alkylene having from 1 to 4 carbon atoms. x and y are each independently an integer having a value from 0 to 4, and the sum of x and y is at least 1. In some of these embodiments, t is 1.

In some embodiments of Formulas II and III, $Rf^a$ is represented by formula $$R_f^4-[OR_f^5]_a-[OR_f^6]_b-O-CF_2-.$$

$R_f^4$ is a perfluorinated alkyl group having from 1 to 6 (in some embodiments, 1 to 4) carbon atoms. $R_f^5$ and $R_f^6$ are each independently perfluorinated alkylene having from 1 to 4 carbon atoms. a and b are each independently integers having a value from 0 to 4. In some of these embodiments, t is 0.

In some embodiments of Formulas II and III, $Rf^a$ is represented by formula $R_f^7-(OCF_2)_p-$, wherein p is an integer of 1 to 6 (in some embodiments, 1 to 4), and $R_f^7$ is selected from the group consisting of a partially fluorinated alkyl group having 1, 2, 3, 4, 5, or 6 carbon atoms and 1 or 2 hydrogen atoms and a fully fluorinated alkyl group having 1, 2, 3 or 4 carbon atoms.

In some embodiments of Formulas II and III, $Rf^a$ is represented by formula: $R_f^8-O-(CF_2)_p-$, wherein p is an integer of 1 to 6 (in some embodiments, 1 to 4) and $R_f^8$ is selected from the group consisting of a partially fluorinated alkyl group having 1, 2, 3, 4, 5, or 6 carbon atoms and 1 or 2 hydrogen atoms and a fully fluorinated alkyl group having 1, 2, 3 or 4 carbon atoms.

$Rf^b$ is selected from the group consisting of $CF_3CFH-$ and $F(C_jF_{2j})-$. In some embodiments of Formula IV, $Rf^b$ is $CF_3CFH-$. In other embodiments, $Rf^b$ is $F(C_jF_{2j})-$, wherein j is an integer from 1 to 4 (i.e., $CF_3-$, $C_2F_5-$, $C_3F_7-$, and $C_4F_9-$). In some embodiments, j is 1. In some embodiments, $Rf^b$ is $F(C_jF_{2j})-$, and p+j has a value of 3 to 7.

In Formula III, L is selected from the group consisting of F and $CF_3$. In some embodiments of Formula III, L is F. In other embodiments, L is $CF_3$.

In Formula III, W is selected from the group consisting of alkylene and arylene. Alkylene includes linear, branched, and cyclic alkylene groups having from 1 to 10 (in some embodiments, 1 to 4) carbon atoms. In some embodiments, W is methylene. In some embodiments, W is ethylene. Arylene includes groups having 1 or 2 aromatic rings, optionally having at least one heteroatom (e.g., N, O, and S) in the ring, and optionally substituted with at least one alkyl group or halogen atom. In some embodiments, W is phenylene.

In Formulas II and III, t is 0 or 1. In some embodiments, t is 1. In some embodiments, t is 0. In embodiments wherein t is 0, $Rf^a$ is typically interrupted by at least one oxygen atom.

In Formula III, m is 1, 2, or 3. In some embodiments, m is 1.

In Formula II, n is 0 or 1. In some embodiments, n is 0. In some embodiments, n is 1.

In Formulas IV and V, p is an integer from 1 to 6 (i.e., 1, 2, 3, 4, 5, or 6). In some embodiments, p is 1, 2, 5, or 6. In some embodiments, p is 3. In some embodiments, p is 1 or 2. In some embodiments, p is 5 or 6.

In Formula V, each k is independently 1 or 2. In some embodiments, k is 1.

In Formula VI, $L^1$ is selected from the group consisting of $-CF_2-$, $-CF_2CF_2-$, and $-CF(CF_3)-$. In some embodiments, $L^1$ is selected from the group consisting of $-CF_2-$ and $-CF_2CF_2-$. In some embodiments, $L^1$ is $-CF_2-$.

In Formula VI, z is an integer from 0 to 3 (i.e., 0, 1, 2, or 3). In some embodiments, z is 0.

In some embodiments, compositions according to the present invention have an Rf group represented by Formula IV (i.e., $Rf^b-O-(CF_2)_p-$). In some embodiments, $Rf^b$ is $CF_3CFH-$. In some embodiments wherein Rf is represented by Formula IV, Rf is selected from the group consisting of $CF_3CFH-O-(CF_2)_3-$ and $CF_3CFH-O-(CF_2)_5-$. In other embodiments wherein Rf is represented by Formula IV, Rf is selected from the group consisting of $CF_3CF_2-O-(CF_2)_3-$ and $CF_3CF_2-O-(CF_2)_5-$. In other embodiments wherein Rf is represented by Formula IV, Rf is selected from the group consisting of:

$CF_3-O-CF_2-CF_2-$;

$C_2F_5-O-CF_2-CF_2-$;

$C_3F_7-O-CF_2-CF_2-$; and $C_4F_9-O-CF_2-CF_2-$.

In other embodiments wherein Rf is represented by Formula IV, Rf is $C_3F_7-O-CF_2-$.

In some embodiments, compositions according to the present invention have an Rf group represented by Formula II. In some of these embodiments, Rf is selected from the group consisting of:

$C_3F_7-O-CHF-$;

$CF_3-O-CF_2CF_2-CF_2-O-CHF-$;

$CF_3CF_2CF_2-O-CF_2CF_2-CF_2-O-CHF-$;

$CF_3-O-CF_2-CF_2-O-CHF-$;

$CF_3-O-CF_2-O-CF_2-CF_2-O-CHF-$;

$CF_3-(O-CF_2)_2-O-CF_2-CF_2-O-CHF-$; and $CF_3-(O-CF_2)_3-O-CF_2-CF_2-O-CHF-$.

In other of these embodiments, Rf is selected from the group consisting of:

$CF_3-O-CHF-CF_2-$;

$CF_3-O-CF_2-CF_2-O-CHF-CF_2-$;

$CF_3-CF_2-O-CHF-CF_2-$;

$CF_3-O-CF_2-CF_2-CF_2-O-CHF-CF_2-$;

$CF_3-O-CF_2-O-CF_2-CF_2-O-CHF-CF_2-$;

$CF_3$—$(O$—$CF_2)_2$—$O$—$CF_2$—$CF_2$—$O$—$CHF$—$CF_2$—; and $CF_3$—$(O$—$CF_2)_3$—$O$—$CF_2$—$CF_2$—$O$—$CHF$—$CF_2$—.

In other of these embodiments, Rf is selected from the group consisting of:

$CF_3$—$O$—$CF_2$—$CHF$—;

$C_3F_7$—$O$—$CF_2$—$CHF$—;

$CF_3$—$O$—$CF_2$—$CF_2$—$CF_2$—$O$—$CF_2$—$CHF$—;

$CF_3$—$O$—$CF_2$—$O$—$CF_2$—$CF_2$—$O$—$CF_2$—$CHF$—;

$CF_3$—$(O$—$CF_2)_2$—$O$—$CF_2$—$CF_2$—$O$—$CF_2$—$CHF$—; and $CF_3$—$(O$—$CF_2)_3$—$O$—$CF_2$—$CF_2$—$O$—$CF_2$—$CHF$—.

In other of these embodiments, Rf is selected from the group consisting of:

$CF_3$—$O$—$CF_2$—$CHF$—$CF_2$—;

$C_2F_5$—$O$—$CF_2$—$CHF$—$CF_2$—;

$C_3F_7$—$O$—$CF_2$—$CHF$—$CF_2$—;

$CF_3$—$O$—$CF_2$—$CF_2$—$CF_2$—$O$—$CF_2$—$CHF$—$CF_2$—;

$CF_3$—$O$—$CF_2$—$O$—$CF_2$—$CF_2$—$O$—$CF_2$—$CHF$—$CF_2$—;

$CF_3$—$(O$—$CF_2)_2$—$O$—$CF_2$—$CF_2$—$O$—$CF_2$—$CHF$—$CF_2$—; and $CF_3$—$(O$—$CF_2)_3$—$O$—$CF_2$—$CF_2$—$O$—$CF_2$—$CHF$—$CF_2$—.

In other of these embodiments, Rf is selected from the group consisting of:

$CF_3$—$O$—$CF_2CF_2$—$CF_2$—$O$—$CHF$—;

$CF_3$—$O$—$CF_2$—$CF_2$—$CF_2$—$O$—$CHF$—$CF_2$—;

$CF_3$—$O$—$CF_2$—$CF_2$—$CF_2$—$O$—$CF_2$—$CHF$—; and $CF_3$—$O$—$CF_2$—$CF_2$—$CF_2$—$O$—$CF_2$—$CHF$—$CF_2$—.

In some embodiments, compositions according to the present invention have an Rf group represented by Formula III. In some of these embodiments, L is F, m is 1, and W is alkylene. In some of these embodiments, Rf is selected from the group consisting of:

$CF_3$—$O$—$CHF$—$CF_2$—$O$—$CH_2$—;

$CF_3$—$O$—$CF_2$—$CF_2$—$CF_2$—$O$—$CHF$—$CF_2$—$O$—$CH_2$;

$C_3F_7$—$O$—$CHF$—$CF_2$—$O$—$CH_2$—;

$C_3F_7$—$O$—$CHF$—$CF_2$—$O$—$CH_2$—$CH_2$—;

$C_3F_7$—$O$—$CF_2$—$CF_2$—$O$—$CHF$—$CF_2$—$OCH_2$—; and $C_3F_7$—$O$—$CF_2$—$CF_2$—$CF_2$—$O$—$CHF$—$CF_2$—$OCH_2$—.

In other of these embodiments, Rf is represented by formula $C_3F_7$—$O$—$CF_2$—$CHF$—$CF_2$—$OCH_2$—. In other of these embodiments, Rf is selected from the group consisting of:

$CF_3$—$CHF$—$CF_2$—$O$—$CH_2$—; and $C_3F_7$—$CF_2$—$CHF$—$CF_2$—$OCH_2$—.

In some embodiments, compositions according to the present invention have an Rf group represented by Formula V (i.e., $F(C_kF_{2k})$—$(O$—$C_kF_{2k})_p$—$O$—$CF_2$—). In some of these embodiments, p is 1, 2, or 3. In some of these embodiments, k is 1. In some of these embodiments, Rf is selected from the group consisting of:

$CF_3$—$(O$—$CF_2)_3$—$O$—$CF_2$—;

$CF_3$—$(O$—$CF_2)_2$—$O$—$CF_2$—;

$CF_3$—$O$—$CF_2$—$O$—$CF_2$—;

$CF_3$—$O$—$CF_2$—$CF_2$—$O$—$CF_2$—;

$C_2F_5$—$O$—$CF_2$—$CF_2$—$O$—$CF_2$—;

$C_2F_5$—$(O$—$CF_2$—$CF_2)_2$—$O$—$CF_2$—; and $CF_3$—$(O$—$CF_2$—$CF_2)_2$—$O$—$CF_2$—.

In some embodiments, compositions according to the present invention have an Rf represented by Formula VI (i.e., $CF_3$—$O$—$(CF_2)_3$—$(OCF(CF_3)$—$CF_2)_z$—$O$-$L^1$-). In some of these embodiments, z is 0, and $L^1$ is selected from the group consisting of —$CF_2$— and —$CF_2CF_2$—. In some of these embodiments, Rf is $CF_3$—$O$—$CF_2$—$CF_2$—$CF_2$—$O$—$CF_2$—; in other of these embodiments, Rf is $CF_3$—$O$—$CF_2$—$CF_2$—$CF_2$—$O$—$CF_2CF_2$—.

In Formula I, each Q is independently selected from the group consisting of a bond, —$C(O)$—$N(R^1)$—, and —$C(O)$—$O$—, wherein $R^1$ is hydrogen or alkyl of 1 to 4 carbon atoms (e.g., methyl, ethyl, n-propyl, isopropyl, n-butyl, isobutyl, or sec-butyl). In some embodiments, each Q is independently selected from the group consisting of —$C(O)$—$N(R^1)$— and —$C(O)$—$O$—. In some embodiments, Q is —$C(O)$—$N(R^1)$—. In some embodiments, $R^1$ is hydrogen or methyl. In some embodiments, $R^1$ is hydrogen.

In Formula I, each X is independently selected from the group consisting of alkylene and arylalkylene, wherein alkylene and arylalkylene are each optionally interrupted by at least one ether linkage (i.e., —$O$—) and optionally terminated by —$N(R^1)$—$C(O)$— or —$O$—$C(O)$—. In some embodiments, X is alkylene terminated by —$O$—$C(O)$—. In some embodiments, X is —$CH_2$—$CH_2$—$O$—$C(O)$—. In some embodiments, X is —$CH_2$—$O$—$C(O)$—.

In Formula I, R is hydrogen or alkyl of 1 to 4 carbon atoms (e.g., methyl, ethyl, n-propyl, isopropyl, n-butyl, isobutyl, or sec-butyl). In some embodiments, R is hydrogen or methyl.

In some embodiments of Formula I, each first divalent unit is represented by formula Ia:

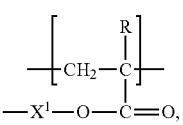

Ia wherein Rf, R, and $R^1$ are as defined above, and each $X^1$ is independently selected from the group consisting of alkylene and arylalkylene, and wherein alkylene and arylalkylene are each optionally interrupted by at least one ether linkage (i.e., —O—). In some embodiments, each $X^1$ is independently alkylene. In some embodiments, $X^1$ is —$CH_2$—$CH_2$—. In some embodiments, X is —$CH_2$—.

Divalent units of Formula I can be prepared, for example, starting with a partially or fully fluorinated carboxylic acid, a salt thereof, a carboxylic acid ester, or a carboxylic acid halide. Partially and fully fluorinated carboxylic acids and salts thereof, carboxylic acid esters, and carboxylic acid halides can be prepared by known methods. For example, starting materials represented by formula $Rf^a$—(O)$_t$—CHF—(CF$_2$)$_n$—COY or [$Rf^a$—(O)$_t$—C(L)H—CF$_2$—O]$_m$—W—COY, wherein Y represents —OH, —O-alkyl (e.g., having from 1 to 4 carbon atoms), or —F, can be prepared from fluorinated olefins of Formula VII:

$$Rf^a\text{—(O)}_t\text{—CF}\!\!=\!\!CF_2 \qquad\qquad VII,$$

wherein $Rf^a$ and t are as defined above. Numerous compounds of Formula VII are known (e.g., perfluorinated vinyl ethers and perfluorinated allyl ethers), and many can be obtained from commercial sources (e.g., 3M Company, St. Paul, Minn., and E.I. du Pont de Nemours and Company, Wilmington, Del.). Others can be prepared by known methods; (see, e.g., U.S. Pat. Nos. 5,350,497 (Hung et al.) and 6,255,536 (Worm et al.)).

Compounds of formula $Rf^a$—(O)$_t$—CHF—(CF$_2$)$_n$—COY, wherein n is 0, can be prepared, for example, by reacting a fluorinated olefin of Formula VII with a base (e.g., ammonia, alkali metal hydroxides, and alkaline earth metal hydroxides). Alternatively, for example, a fluorinated olefin of Formula VII can be reacted with an aliphatic alcohol (e.g., methanol, ethanol, n-butanol, and t-butanol) in an alkaline medium, and the resulting ether can be decomposed under acidic conditions to provide a fluorinated carboxylic acid of formula $Rf^a$—(O)$_t$—CHF—(CF$_2$)$_n$—COY, wherein n is 0. Compounds of formula $Rf^a$—(O)$_t$—CHF—(CF$_2$)$_n$—COY, wherein n is 1, can be prepared, for example, by a free radical reaction of the fluorinated olefin of Formula VII with methanol followed by an oxidation of the resulting reaction product using conventional methods. Conditions for these reactions are described, for example, in U.S. Pat. App. No. 2007/0015864 (Hintzer et al.), the disclosure of which, relating to the preparation of compounds of formula $Rf^a$—(O)$_t$—CHF—(CF$_2$)$_n$—COY, is incorporated herein by reference.

Fluorinated vinyl ethers of Formula VII, wherein t is 1, can be oxidized (e.g., with oxygen) in the presence of a fluoride source (e.g., antimony pentafluoride) to carboxylic acid fluorides of formula $Rf^a$—O—$CF_2C(O)F$ according to the methods described in U.S. Pat. No. 4,987,254 (Schwertfeger et al.), in column 1, line 45 to column 2, line 42, the disclosure of which is incorporated herein by reference. Examples of compounds that can be prepared according to this method include $CF_3$—(CF$_2$)$_2$—O—$CF_2$—C(O)—$CH_3$ and $CF_3$—O—(CF$_2$)$_3$—O—$CF_2$—C(O)—$CH_3$, which are described in U.S. Pat. No. 2007/0015864 (Hintzer et al.), the disclosure of which, relating to the preparation of these compounds, is incorporated herein by reference.

Compounds of formula [$Rf^a$—(O)$_t$—C(L)H—CF$_2$—O]$_m$—W—COY can be prepared, for example, by reaction of a fluorinated olefin of Formula VII with a hydroxyl compound of Formula VIII according to the reaction:

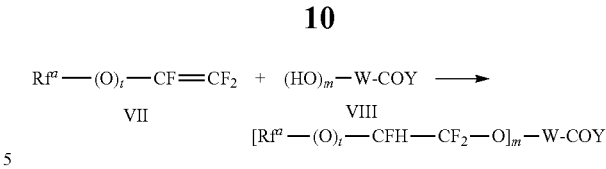

wherein $Rf^a$ and t are as defined above, m is 1, 2, or 3, W is alkylene or arylene, and Y is as defined above. Typically, Y represents —O-alkyl (e.g., having from 1 to 4 carbon atoms in the alkyl group). Compounds of Formula VIII can be obtained, for example, from commercial sources or can be prepared by known methods. The reaction can be carried out, for example, under conditions described in U.S. Pat. App. No. 2007/0015864 (Hintzer et al.), the disclosure of which, relating to the preparation of compounds of formula [$Rf^a$—(O)$_t$—C(L)H—CF$_2$—O]$_m$—W—COY, is incorporated herein by reference.

Fluorinated carboxylic acids and their derivatives according to formula $Rf^b$—O—(CF$_2$)$_p$—COY can be prepared, for example, by decarbonylation of difunctional perfluorinated acid fluoride according to the reaction:

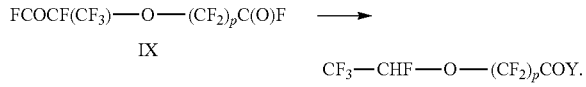

The reaction is typically carried out at an elevated temperature in the presence of water and base (e.g., a metal hydroxide or metal carbonate) according to known methods; see, e.g., U.S. Pat. No. 3,555,100 (Garth et al.), the disclosure of which, relating to the decarbonylation of difunctional acid fluorides, is incorporated herein by reference. The decarbonylation of compounds of Formula IX may also be carried out in the presence of a fluoride source (e.g., antimony pentafluoride) to provide compounds of formula $CF_3$—$CF_2$—O—(CF$_2$)$_p$COY.

Compounds of Formula IX are available, for example, from the coupling of perfluorinated diacid fluorides of Formula X and hexafluoropropylene oxide according to the reaction:

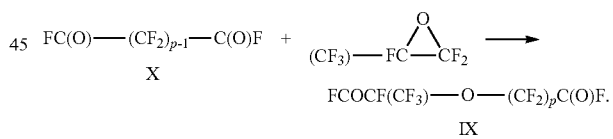

Compounds of Formula X are available, for example, by electrochemical fluorination or direct fluorination of a difunctional ester of formula $CH_3OCO(CH_2)_{p-1}COOCH_3$ or a lactone of formula:

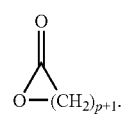

General procedures for carrying out electrochemical fluorination are described, for example, in U.S. Pat. No. 2,713,593 (Brice et al.) and International App. Pub. No. WO 98/50603, published Nov. 12, 1998. General procedures for carrying out direct fluorination are described, for example, in U.S. Pat. No. 5,488,142 (Fall et al.).

Some carboxylic acids and carboxylic acid fluorides useful for preparing compositions according to the present invention are commercially available. For example, carboxylic acids of formula $CF_3-[O-CF_2]_{1-3}C(O)OH$ are available, for example, from Anles Ltd., St. Petersburg, Russia, and acid fluorides of formulas $C_2F_5-O-(CF_2)_2-C(O)F$, $C_3F_7-O-(CF_2)_2-C(O)F$, and $CF_3CF_2-O-CF_2CF_2-O-CF_2C(O)F$ are available, for example, from Exfluor, Round Rock, Tex.

Divalent units of Formula I can be prepared, for example, by reaction of a partially or fully fluorinated carboxylic acid or salt thereof, an acid fluoride thereof, or a carboxylic acid ester (e.g., $Rf-C(O)-OCH_3$) using a variety of conventional methods to prepare compounds with polymerizable double bonds, for example, having formula $Rf-Q-X-C(R)=CH_2$, which can then be reacted, for example, under free-radical conditions. For example, a compound of formula $Rf-(CO)NHCH_2CH_2O(CO)C(R)=CH_2$ can be prepared by first reacting $Rf-C(O)-OCH_3$, for example, with ethanolamine to prepare alcohol-terminated $Rf-(CO)NHCH_2CH_2OH$, which can then be reacted with methacrylic acid, methacrylic anhydride, acrylic acid or acryloyl chloride to prepare the compound of formula $Rf-(CO)NHCH_2CH_2O(CO)C(R)=CH_2$, wherein R is methyl or hydrogen, respectively. Other amino alcohols (e.g., amino alcohols of formula $NR^1HXOH$) can be used in this reaction sequence to provide compounds of formula $Rf-Q-X-C(R)=CH_2$, wherein Q is $-C(O)-N(R^1)-$, X is alkylene or arylalkylene terminated by $-O-C(O)-$ and optionally interrupted by at least one ether linkage (i.e., $-O-$), and $R^1$ and R are as defined above. In another example, $Rf-C(O)-OCH_3$ can be reacted with allyl amine or N-allyl aniline to prepare a compound of formula $Rf-(CO)NHCH_2-CH=CH_2$ or $Rf-(CO)NH-C_6H_4-CH_2CH_2=CH_2$, respectively. Similarly, $Rf-C(O)-OCH_3$ can be reacted, for example, with allyl alcohol to provide a compound of formula $Rf-(CO)OCH_2CH=CH_2$. In further examples, an ester of formula $Rf-C(O)-OCH_3$ or a carboxylic acid of formula $Rf-C(O)-OH$ can be reduced using conventional methods (e.g., hydride, such as sodium borohydride, reduction) to an alcohol of formula $Rf-CH_2OH$. The alcohol of formula $Rf-CH_2OH$ can then be reacted with methacryloyl chloride, for example, to provide a compound of formula $Rf-CH_2O(CO)C(R)=CH_2$. The alcohol of formula $Rf-CH_2OH$ can also be reacted with allyl bromide, for example, to provide a compound of formula $Rf-CH_2OCH_2CH=CH_2$. Examples of suitable reactions and reactants are further disclosed, for example, in the European patent EP 870 778 A1, published Oct. 14, 1998, and U.S. Pat. No. 3,553,179 (Bartlett et al.), the disclosures of which are incorporated herein by reference.

In some embodiments, compositions according to the present invention further comprise at least one (e.g., at least 1, 2, 5, 10, 15, 20, 25, or even at least 50) divalent unit represented by Formula XI:

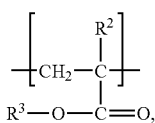

XI wherein each $R^2$ is independently selected from the group consisting of hydrogen and alkyl having from 1 to 4 carbon atoms (e.g., methyl, ethyl, n-propyl, isopropyl, n-butyl, isobutyl, or sec-butyl), and wherein each $R^3$ is independently alkyl having from 1 to 30 (in some embodiments, 1 to 25, 1 to 20, 1 to 10, 4 to 25, 8 to 25, or even 12 to 25) carbon atoms. In some embodiments, $R^2$ is selected from the group consisting of hydrogen and methyl. In some embodiments, $R^3$ is selected from the group consisting of hexadecyl and octadecyl. In some of these embodiments, the composition is preparable by copolymerization of at least one compound represented by formula:

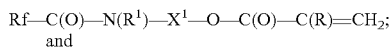

and at least one compound represented by formula:

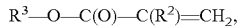

wherein $X^1$ is independently selected from the group consisting of alkylene and arylalkylene, and wherein alkylene and arylalkylene are each optionally interrupted by at least one ether linkage (i.e., $-O-$).

Compounds of formula $R^3-O-C(O)-C(R^2)=CH_2$, (e.g., methyl methacrylate, butyl acrylate, hexadecyl methacrylate, octadecyl methacrylate, stearyl acrylate, behenyl methacrylate) are available, for example, from several chemical suppliers (e.g., Sigma-Aldrich Company, St. Louis, Mo.; VWR International, West Chester, Pa.; Monomer-Polymer & Dajac Labs, Festerville, Pa.; Avocado Organics, Ward Hill, Mass.; and Ciba Specialty Chemicals, Basel, Switzerland) or may be synthesized by conventional methods. Some compounds of formula $R^3-O-C(O)-C(R^2)=CH_2$ are available as single isomers (e.g., straight-chain isomer) of single compounds. Other compounds of formula $R^3-O-C(O)-C(R^2)=CH_2$ are available, for example, as mixtures of isomers (e.g., straight-chain and branched isomers), mixtures of compounds (e.g., hexadecyl acrylate and octadecylacrylate), and combinations thereof.

In some embodiments, compositions according to the present invention further comprise a polyalkyleneoxy segment. In some of these embodiments, the compositions comprise at least one (e.g., at least 1, 2, 5, 10, 15, 20, or even at least 25) ether-containing divalent unit represented by formula:

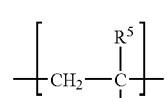

XII

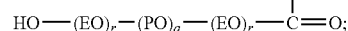

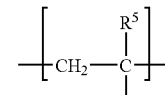

XIII

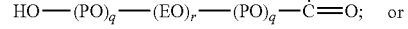  or

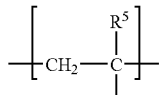

XIV

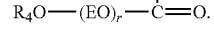

wherein
  $R^4$ and $R^5$ are each independently hydrogen or alkyl of 1 to 4 carbon atoms (e.g., methyl, ethyl, n-propyl, isopropyl, butyl, isobutyl, or t-butyl);
  EO represents $-CH_2CH_2O-$;
  each PO independently represents $-CH(CH_3)CH_2O-$ or $-CH_2CH(CH_3)O-$;

each r is independently an integer from 1 to 128 (in some embodiments, from 7 to about 128, or even from 14 to about 128); and each q is independently an integer from 0 to 55 (in some embodiments, from about 21 to about 54 or from about 9 to about 25).

In some embodiments, $R^4$ and $R^5$ are each independently hydrogen or methyl. In some embodiments, the composition is preparable by copolymerization of at least one compound represented by formula:

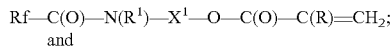
and at least one compound represented by formula:

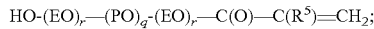

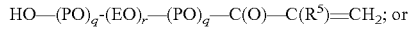

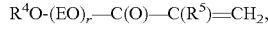

wherein $X^1$ is independently selected from the group consisting of alkylene and arylalkylene, and wherein alkylene and arylalkylene are each optionally interrupted by at least one ether linkage (i.e., —O—). In some embodiments, the ether-containing divalent unit is represented by formula:

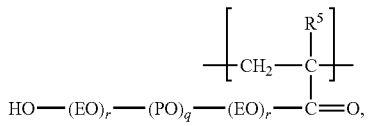

wherein r is an integer from 5 to 15 (in some embodiments, from 9 to 13 or even 11), and wherein q is an integer from 15 to 25 (in some embodiments, 19 to 23 or even 21).

Compounds of formulas HO-(EO)$_r$—(PO)$_q$-(EO)$_r$—C(O)—C($R^5$)=CH$_2$, HO—(PO)$_q$-(EO)$_r$—(PO)$_q$—C(O)—C($R^5$)=CH$_2$, or $R^4$O-(EO)$_r$—C(O)—C($R^5$)=CH$_2$ can be prepared by known methods, for example, combining acryloyl chloride with a polyethylene glycol having a molecular weight of about 200 to 10,000 grams per mole (e.g., those available from Union Carbide, a wholly owned subsidiary of Dow Chemical, Midland, Mich., under the trade designation "CARBOWAX") or a block copolymer of ethylene oxide and propylene oxide having a molecular weight of about 500 to 15000 grams per mole (e.g., those available from BASF Corporation, Ludwigshafen, Germany, under the trade designation "PLURONIC"). When a diol-functional copolymer of ethylene oxide and propylene oxide is used, difunctional acrylates (e.g., represented by formula CH$_2$=C($R^5$)—C(O)—O-(EO)$_r$—(PO)$_q$-(EO)$_r$—C(O)—C($R^5$)=CH$_2$ or CH$_2$=C($R^5$)—C(O)—O—(PO)$_q$-(EO)$_r$—(PO)$_q$—C(O)—C($R^5$)=CH$_2$, wherein r, q, $R^5$, EO, and PO are as defined above) can be prepared and can be used in a copolymerization reaction with a compound having formula Rf-Q-X—C(R)=CH$_2$ or Rf—C(O)—N($R^1$)—$X^1$—O—C(O)—C(R)=CH$_2$.

In some embodiments wherein compositions according to the present invention comprise a polyalkyleneoxy segment, the polyalkyleneoxy segment may be present in units represented by formula:

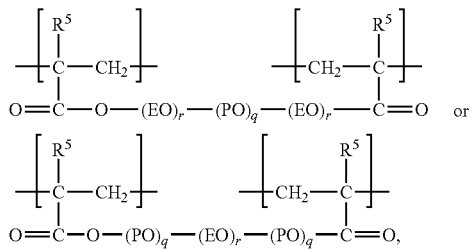

wherein r, q, $R^5$, EO, and PO are as defined in any above embodiments.

In some embodiments wherein compositions according to the present invention comprise a polyalkyleneoxy segment, the polyalkyleneoxy segment may be a sulfur-terminated segment (e.g., —S(O)$_{0-2}$—C$_s$H$_{2s}$—C(O)—O-(EO)$_r$—C(O)—C$_s$H$_{2s}$—S(O)$_{0-2}$—, —S(O)$_{0-2}$—C$_s$H$_{2s}$—C(O)—O-(EO)$_r$—(PO)$_q$-(EO)$_r$—C(O)—C$_s$H$_{2s}$—S(O)$_{0-2}$—, or —S(O)$_{0-2}$—C$_s$H$_{2s}$—C(O)—O—(PO)$_q$-(EO)$_r$—(PO)$_q$—C(O)—C$_s$H$_{2s}$—S(O)$_{0-2}$—, wherein r, q, EO, and PO are as defined above and s is an integer from 1 to 5, or in some embodiments, 2 to 3). Sulfur-terminated segments can be incorporated into the compositions by copolymerization of a difunctional mercaptan, which can react with fluorinated acrylates (e.g., Rf-Q-X—C(R)=CH$_2$ or Rf—C(O)—N($R^1$)—$X^1$—O—C(O)—C(R)=CH$_2$) under free-radical polymerization conditions to provide block copolymers. Examples of difunctional mercaptans include HS—C$_s$H$_{2s}$—C(O)—O-(EO)$_r$—C(O)—C$_s$H$_{2s}$—SH, HS—C$_s$H$_{2s}$—C(O)—O-(EO)$_r$—(PO)$_q$-(EO)$_r$—C(O)—C$_s$H$_{2s}$—SH, or HS—C$_s$H$_{2s}$—C(O)—O—(PO)$_q$-(EO)$_r$—(PO)$_q$—C(O)—C$_s$H$_{2s}$—SH, wherein r, q, EO, and PO are as defined above and s is an integer from 1 to 5, or in some embodiments, 2 to 3. The resulting polymer or oligomer can then optionally be oxidized using conventional techniques. Difunctional mercaptans can be prepared, for example, by reaction of a diol-functional polyethylene glycol or a block copolymer of ethylene oxide and propylene oxide with, for example, mercaptoacetic acid or mercaptopropionic acid. In other embodiments, polyalkyleneoxy-containing diacrylates can be treated with H$_2$S or other sulfhydryl-containing compounds according to the methods of U.S. Pat. No. 3,278,352 (Erickson), incorporated herein by reference, to provide mercaptan-terminated polyalkyleneoxy compounds.

In some embodiments wherein compositions according to the present invention comprise a polyalkyleneoxy segment, the composition is preparable by copolymerization of at least one compound represented by formula:

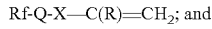 and at least one compound represented by formula:

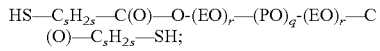

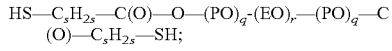

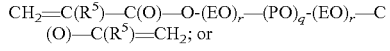

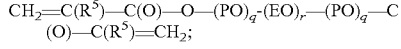

wherein s, r, q, $R^5$, EO, and PO are as defined in any of the embodiments above.

In some embodiments, compositions according to the present invention further comprise at least one (e.g., at least 1, 2, 5, 10, 15, 20, or even at least 25) anionic divalent unit represented by formula:

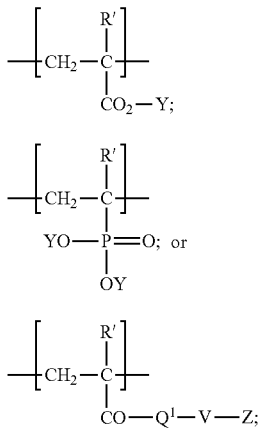

wherein
Q$^1$ is selected from the group consisting of —O—, —S—, and —N(R$^1$)— (in some embodiments, —O—);
R' and R$^1$ are each independently selected from the group consisting of hydrogen and alkyl having from 1 to 4 carbon atoms (e.g., methyl, ethyl, n-propyl, isopropyl, butyl, isobutyl, or t-butyl);
V is alkylene that is optionally interrupted by at least one ether linkage (i.e., —O—) or amine linkage (i.e., —N(R$^1$)—;
each Y is independently selected from the group consisting of hydrogen and a counter cation; and
Z is selected from the group consisting of —P(O)(OY)$_2$, —O—P(O)(OY)$_2$, —SO$_3$Y, and CO$_2$Y.

In some embodiments, R' and R$^1$ are each independently hydrogen or methyl. In some embodiments, V is alkylene having from 2 to 4 (in some embodiments, 2) carbon atoms. In some embodiments, Y is hydrogen. In some embodiments, Y is a counter cation. Exemplary Y counter cations include alkali metal (e.g., sodium, potassium, and lithium), ammonium, alkyl ammonium (e.g., tetraalkylammonium), and five to seven membered heterocyclic groups having a positively charged nitrogen atom (e.g, a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion).

Divalent units of Formulas XV, XVI, and XVII can be incorporated into compositions according to the present invention by copolymerization of a compound of formula Rf-Q-X—C(R)=CH$_2$ with a compound of formula YOOC—C(R')=CH$_2$, (YO)$_2$(O)P—C(R')=CH$_2$, and Z—V-Q$^1$C(O)—C(R')=CH$_2$, respectively. Useful compounds of these formulas include acrylic acid, methacrylic acid, β-carboxyethyl acrylate, β-carboxyethyl methacryate, vinyl phosphonic acid, ethylene glycol methacrylate phosphate, and 2-acrylamido-2-methyl-1-propane sulfonic acid (AMPS).

In some embodiments of a method of treating a surface according to the present invention, the method comprises contacting the surface with a composition comprising a divalent unit of Formula XV, XVI, or XVII. In some of these embodiments, Z is —P(O)(OY)$_2$ or —O—P(O)(OY)$_2$. In some of these embodiments, the surface comprises metal.

In some embodiments, compositions according to the present invention further comprise at least one (e.g., at least 1, 2, 5, 10, 15, 20, or even at least 25) divalent unit represented by formula:

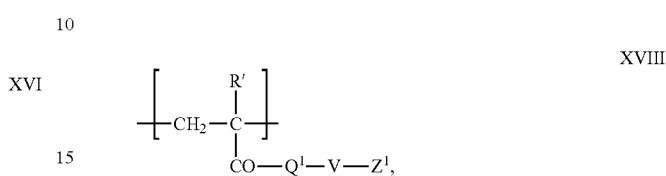

wherein
Q$^1$ is selected from the group consisting of —O—, —S—, and —N(R$^1$)— (in some embodiments, —O—);
R' and R$^1$ are each independently selected from the group consisting of hydrogen and alkyl having from 1 to 4 carbon atoms (e.g., methyl, ethyl, n-propyl, isopropyl, butyl, isobutyl, or t-butyl);
V is alkylene that is optionally interrupted by at least one ether linkage (i.e., —O—) or amine linkage (i.e., —N(R$^1$)— (in some embodiments, alkylene having from 2 to 4 or even 2 carbon atoms); and
Z$^1$ is selected from the group consisting of —[N(R$^8$)$_3$]$^+$M$^-$, —N$^+$(OY$^1$)(R$^9$)$_3$, —N$^+$(R$^8$)$_2$—(CH$_2$)$_g$—SO$_3$Y$^1$, and —N$^+$(R$^8$)$_2$—(CH$_2$)$_g$—CO$_2$Y$^1$, wherein
each R$^8$ is independently selected from the group consisting of hydrogen and alkyl having from 1 to 6 carbon atoms (e.g., methyl, ethyl, n-propyl, isopropyl, butyl, isobutyl, t-butyl, n-pentyl, isopentyl, n-hexyl);
each R$^9$ is independently selected from the group consisting of hydrogen and alkyl having from 1 to 6 carbon atoms (e.g., methyl, ethyl, n-propyl, isopropyl, butyl, isobutyl, t-butyl, n-pentyl, isopentyl, n-hexyl), wherein alkyl is optionally substituted by at least one halogen, alkoxy, nitro, or nitrile group, or two R$^9$ groups may join to form a 5 to 7-membered ring optionally containing at least one O, N, or S and optionally substituted by alkyl having 1 to 6 carbon atoms;
each g is independently an integer from 1 to 6 (i.e., 1, 2, 3, 4, 5, or 6);
M$^-$ is a counter anion (e.g., acetate, chloride, iodide, and methylsulphate); and
Y$^1$ is selected from the group consisting of hydrogen and free anion. In some embodiments, R' and R$^1$ are each independently hydrogen or methyl.

Divalent units of Formula XVIII can be incorporated into compositions according to the present invention by copolymerization of a compound of formula Rf-Q-X—C(R)=CH$_2$ with a compound of formula Z$^1$—V-Q$^1$C(O)—C(R')=CH$_2$. Useful compounds of formula Z$^1$—V-Q$^1$C(O)—C(R')=CH$_2$ include aminoalkyl (meth)acrylates such as N,N-diethylaminoethylmethacrylate, N,N'-dimethylaminoethylmethacrylate and N-t-butylaminoethylmethacrylate, which are commercially available, for example, from Sigma-Aldrich and can be quaternized using conventional techniques, for example, by reaction with an alkyl halide (e.g., bromobutane, bromoheptane, bromodecane, bromododecane, or bromohexadecane) in a suitable solvent and optionally in the presence of a free-radical inhibitor to provide a compound wherein Z$^1$ is —[N(R$^8$)$_3$]$^+$M$^-$. Other useful compounds having formula Z$^1$—V-Q$^1$C(O)—C(R')=CH$_2$ include N,N-dimethylaminoethyl acrylate methyl chloride quaternary and N,N-dimethylaminoethyl methacrylate methyl chloride quaternary available from Ciba Specialty Chemicals, Basel, Switzerland, under the trade designations "CIBA AGEFLEX FA1Q80MC" and "CIBA AGEFLEX FM1Q75MC", respectively.

In some embodiments, compositions according to the present invention further comprise at least one (e.g., at least 1, 2, 5, 10, 15, 20, or even at least 25) divalent unit represented by formula:

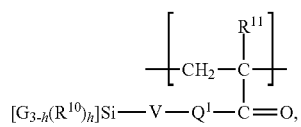

XIX wherein
- each $R^{10}$ is independently selected from the group consisting of alkyl having from 1 to 6 carbon atoms (e.g., methyl, ethyl, n-propyl, isopropyl, butyl, isobutyl, t-butyl, n-pentyl, isopentyl, n-hexyl) and aryl (e.g., phenyl);
- $Q^1$ is selected from the group consisting of —O—, —S—, and —N($R^1$)— (in some embodiments, —O—);
- $R^1$ and $R^{11}$ are each independently selected from the group consisting of hydrogen and alkyl having from 1 to 4 carbon atoms (e.g., methyl, ethyl, n-propyl, isopropyl, butyl, isobutyl, or t-butyl);
- V is alkylene that is optionally interrupted by at least one ether linkage (i.e., —O—) or amine linkage (i.e., —N($R^1$)— (in some embodiments, alkylene having from 2 to 4 or even 2 carbon atoms);
- each G is independently selected from the group consisting of hydroxyl, alkoxy, acyloxy, and halogen; and
- h is 0, 1, or 2 (in some embodiments, 0).

In some embodiments, $R^1$ and $R^{11}$ are each independently hydrogen or methyl.

Divalent units of Formula XIX can be incorporated into compositions according to the present invention by copolymerization of a compound of formula Rf-Q-X—C(R)=CH$_2$ with a compound of formula [G$_{3-h}$(R$_{10}$)$_h$]—Si—V-Q$^1$C(O)—C(R$^{11}$)=CH$_2$ (e.g., CH$_2$=C(CH$_3$)C(O)OCH$_2$CH$_2$CH$_2$Si(OCH$_3$)$_3$ available, for example, from OSi Specialties, Greenwich, Conn. under the trade designation "SILQUEST A-174 SILANE").

The polymerization reaction of at least one compound of formula Rf-Q-X—C(R)=CH$_2$ and at least one second compound, for example, of formula $R^3$—O—C(O)—C($R^2$)=CH$_2$, HO-(EO)$_r$—(PO)$_q$-(EO)$_r$—C(O)—C($R^5$)=CH$_2$, HO—(PO)$_q$-(EO)$_r$—(PO)$_q$—C(O)—C($R^5$)=CH$_2$, $R^4$O-(EO)$_r$—C(O)—C($R^5$)=CH$_2$, YOOC—C(R')=CH$_2$, (YO)$_2$(O)P—C(R')=CH$_2$, Z—V-Q$^1$C(O)—C(R')=CH$_2$, or $Z^1$—V-Q$^1$C(O)—C(R')=CH$_2$ can be carried out in the presence of an added free-radical initiator. Free radical initiators such as those widely known and used in the art may be used to initiate polymerization of the components. Exemplary free-radical initiators are described in U.S. Pat. No. 6,664,354 (Savu et al.), the disclosure of which, relating to free-radical initiators, is incorporated herein by reference. In some embodiments, the polymer or oligomer that is formed is a random graft copolymer. In some embodiments, the polymer or oligomer that is formed is a block copolymer.

In some embodiments, the polymerization reaction is carried out in solvent. The components may be present in the reaction medium at any suitable concentration, (e.g., from about 5 percent to about 80 percent by weight based on the total weight of the reaction mixture). Illustrative examples of suitable solvents include aliphatic and alicyclic hydrocarbons (e.g., hexane, heptane, cyclohexane), aromatic solvents (e.g., benzene, toluene, xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "HFE-7100" and "HFE-7200"), and mixtures thereof.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or even from about 50° C. to about 80° C.).

Free-radical polymerizations may be carried out in the presence of chain transfer agents. Typical chain transfer agents that may be used in the preparation compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); poly(ethylene glycol)-substituted mercaptans; carboxy-substituted mercaptans (e.g., mercaptopropionic acid or mercaptoacetic acid): amino-substituted mercaptans (e.g., 2-mercaptoethylamine); difunctional mercaptans (e.g., di(2-mercaptoethyl) sulfide); silane-substituted mercaptans (e.g., 3-mercaptopropyltrimethoxysilane, available, for example, from Huls America, Inc., Somerset, N.J., under the trade designation "DYNASYLAN") and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of a polyacrylate polymer or copolymer.

Compositions according to the present invention may also be preparable by adding additional monomers to the polymerization reaction. For example, a compound formula HO—V—O—C(O)—C(R')=CH$_2$, wherein R' and V are as defined above may be used. Examples of these monomers include hydroxyethyl methacrylate. Other examples include vinylidene chloride, vinyl chloride, silicone acrylates available, for example, from Shin-Etsu Silicones of America, Inc., Akron, Ohio, under the trade designation "X22-2426", urethane acrylates available, for example, from Sartomer Company, Exton, Pa. under the trade designation "CN966J75", and fluorinated acrylates (e.g., 3,3,4,4,5,5,6,6-nonafluorohexyl acrylate from Daikin Chemical Sales, Osaka, Japan, 3,3,4,4,5,5,6,6,6-nonafluorohexyl 2-methylacrylate from Indofine Chemical Co., Hillsborough, N.J., and acrylates described in U.S. Pat. Nos. 2,803,615 (Albrecht et al.) and 6,664,354 (Savu et al.), the disclosures of which, relating to free-radically polymerizable monomers and methods of their preparation, are incorporated herein by reference).

In some embodiments, compositions according to the present invention have weight average molecular weights in a range from 1000 grams per mole to 100,000 grams per mole.

In some embodiments, the weight average molecular weight is at least 2000, 3000, 4000, 5000, 6000, 7000, 8000, 9000, or even 10000 grams per mole up to 30,000, 40,000, 50,000, 60,000, 70,000, 80,000, or even up to 90,000 grams per mole. Compositions according to the present invention typically have a distribution of molecular weights and compositions. Weight average molecular weights can be measured, for example, by gel permeation chromatography (i.e., size exclusion chromatography) using techniques known to one of skill in the art.

Compositions according to the present invention may be formulated into concentrates (e.g., in at least one of water or solvent), wherein the composition is present in an amount of at least 10, 20, 30, or even at least 40 percent by weight, based on the total weight of the concentrate. Techniques for preparing concentrates are well known in the art.

In some embodiments, the present invention provides a formulation comprising at least one of water or a water-miscible solvent and a composition according to the present invention. In some these embodiments, the composition comprises at least one divalent unit of Formula XII, XIII, XIV, XV, XVI, XVII, XVIII, or XIX.

In some embodiments, compositions according to and/or useful for practicing methods according to the present invention may be present in a formulation comprising water and a non-fluorinated polymer. These aqueous formulations may be useful, for example, for coatings (e.g., floor finishes, varnishes, automotive coatings, marine coatings, sealers, hard coats for plastic lenses, coatings for metal cans or coils, and inks). When used in aqueous formulations (e.g., for coatings) compositions according to the present invention can be formulated into an aqueous solution or dispersion at a final concentration, for example, of about 0.001 to about 1 weight percent (wt. %), about 0.001 to about 0.5 wt. %, or about 0.01 to about 0.3 wt. %, based on the weight of the solution or dispersion. In some embodiments, compositions according to the present invention may enhance wetting and/or leveling of a coating (e.g., an aqueous coating) on a substrate surface and may provide better dispersability of a component (e.g., a thickening agent or pigment) within the coating formulation.

In some embodiments, aqueous formulations comprising compositions according to the present invention (e.g., for coatings) include at least one non-fluorinated polymer, typically a film-forming polymer. Examples of suitable polymers include acrylic polymers, (e.g., poly(methyl methacrylate-co-ethyl acrylate) or poly(methyl acrylate-co-acrylic acid)); polyurethanes, (e.g., reaction products of aliphatic, cycloaliphatic or aromatic diisocyanates with polyester glycols or polyether glycols); polyolefins, (e.g., polystyrene); copolymers of styrene with acrylate(s) (e.g., poly(styrene-co-butyl acrylate); polyesters, (e.g, polyethylene terephthalate, polyethylene terephthalate isophthalate, or polycaprolactone); polyamides, (e.g., polyhexamethylene adipamide); vinyl polymers, (e.g., poly(vinyl acetate/methyl acrylate), poly(vinylidene chloride/vinyl acetate); polydienes, (e.g., poly(butadiene/styrene)); cellulosic derivatives including cellulose ethers and cellulose esters, (e.g., ethyl cellulose, or cellulose acetate/butyrate), urethane-acrylate copolymers, and combinations thereof. Methods and materials for preparing aqueous emulsions or latexes of such polymers are well known, and many are widely available from commercial sources. In some embodiments, the non-fluorinated polymer is at least one of an acrylic polymer, a polyurethane, a polystyrene, or a styrene-acrylate copolymer.

In some embodiments, aqueous formulations comprising compositions according to the present invention may contain one or more water-miscible solvents (e.g., coalescing solvents) including ethers of polyhydric alcohols (e.g., ethylene glycol monomethyl (or monoethyl)ether, diethylene glycol methyl (or ethyl)ether, triethylene glycol monomethyl (or monoethyl)ether, 2-butoxyethanol (i.e., butyl cellusolve), or di(propylene glycol) methyl ether (DPM)); alkylene glycols and polyalkylene glycols (e.g., ethylene glycol, propylene glycol, butylene glycol, triethylene glycol, hexylene glycol, diethylene glycol, polyethylene glycol, polypropylene glycol); and 2,2,4-trimethyl-1,3-pentanediol monoisobutyrate (an ester alcohol available, for example, from Eastman Chemical Company, Kingsport, Tenn., under the trade designation "TEXANOL"). Other water-miscible organic solvents that may be added to a formulation include alcohols having 1 to 4 carbon atoms (e.g., methanol, ethanol, isopropanol, or isobutanol); amides and lactams, (e.g., N,N-dimethylformamide, N,N-dimethylacetamide, or N-methylpyrrolidone); ketones and ketoalcohols (e.g., acetone, cyclohexanone, methyl isobutyl ketone, diacetone alcohol); ethers (e.g., tetrahydrofuran or dioxane); 1,3-dimethyl-2-imidazolidinone; and combinations thereof.

Depending on the application, aqueous formulations comprising compositions according to the present invention may also include at least one additive (e.g., biocides, fillers, additional leveling agents, emulsifiers, defoamers, anticorrosive agents, dispersants, and rust inhibitors). The aqueous formulation may also optionally contain at least one pigment.

When an aqueous formulation comprising a non-fluorinated polymer and a composition according to the present invention is applied to a surface (e.g., in coating applications), water and solvent typically evaporate, and the polymer particles coalesce to form a continuous film. The aqueous formulation can be applied to a surface, dried, and optionally heated, leaving the surface with a solid coating. The addition of compositions according to the present invention may improve the film forming properties of some formulations by improving the ability of the coating to wet the substrate and/or by allowing for even evaporation of the water (i.e., leveling) during film formation. Compositions according to the present invention may also impart corrosion-resistant properties to the final solid coating, which provides an additional benefit when the substrate is a metallic substrate (e.g., an electronic component).

Aqueous formulations that may be improved by the addition of compositions according to the present invention include floor polishes and finishes, varnishes for a variety of substrates (e.g., wood floors), aqueous gels applied in the manufacture of photographic film, automotive or marine coatings (e.g., primers, base coats, or topcoats), sealers for porous substrates (e.g., wood, concrete, or natural stone), hard coats for plastic lenses, coatings for metallic substrates (e.g., cans, coils, electronic components, or signage), inks (e.g, for pens or gravure, screen, or thermal printing), and coatings used in the manufacture of electronic devices (e.g., photoresist inks) The aqueous formulations may be clear or pigmented.

In some embodiments, aqueous formulations comprising compositions according to some embodiments of the present invention and a non-fluorinated polymer may be useful as alkaline waterborne coating formulations, for example, amine-stabilized floor finish formulations. In some of these embodiments, the composition comprises at least one anionic divalent unit.

Methods of treating a surface according to the present invention can be carried out using a variety of application methods known to one of skill in the art (e.g., brushing, mopping, bar coating, spraying, dip coating, gravure coating, and roll coating).

In some embodiments of methods of treating a surface according to the present invention, the surface is a flooring surface comprising at least one of vinyl composition tiles, vinyl sheet flooring, linoleum, rubber sheeting, rubber tile, cork, synthetic sports flooring and vinyl asbestos tile, and non-resilient flooring substrates such as terrazzo, concrete, wood flooring, bamboo, wood laminate, engineered wood products (e.g., wood epoxy blends, permanently coated substrates such as those available from Pergo, Raleigh, N.C. under the trade designation "PERGO" and from DIAN, Gardena, Calif., under the trade designation "PARQUET BY DIAN"), stone, marble, slate, ceramic tile, grout, and dry shake flooring.

Compositions according to the present invention may also be useful as additives in cleaning solutions and may provide improved wetting of the surface and/or the contaminants to be removed. In some embodiments, methods of treating a surface according to the present invention include cleaning a surface. A cleaning solution is typically formulated to include about 0.001 to about 1 wt. %, or about 0.001 to about 0.5 wt. % of a composition according to the present invention, based on the total weight of the formulation. For hard-surface cleaning, an aqueous formulation comprising a composition according to the present invention is sprayed (e.g., from a spray bottle) or otherwise applied to a hard surface such as window glass, a mirror, or ceramic tile, and the surface is wiped clean with a paper or fabric wipe. The contaminated part may also be immersed or dipped into the aqueous composition. For methods of cleaning used in the manufacture of electronic materials, the cleaning solution is typically placed in a bath, and electronic parts are either dipped or run through the bath on a conveyor belt.

In some embodiments of formulations comprising at least one of water or a water-miscible solvent and a composition according to the present invention, the formulation further comprises at least one gas (i.e., the formulation is a foam).

The present invention provides a formulation comprising a hydrocarbon solvent and a composition according to the present invention. In these formulations, compositions according to the present invention typically include at least one divalent unit of Formula XI. Suitable hydrocarbon solvents include crude oil; refined hydrocarbons (e.g., gasoline, kerosene, and diesel); paraffinic and isoparaffinic hydrocarbons (e.g., pentanes, hexanes, heptanes, higher alkanes, and isoparaffinic solvents obtained from Total Fina, Paris, France, under trade designations "ISANE IP 130" and "ISANE IP 175" and from Exxon Mobil Chemicals, Houston, Tex., under the trade designation "ISOPAR"); mineral oil; ligroin; naphthenes; aromatics (e.g., xylenes and toluene); natural gas condensates; and combinations (either miscible or immiscible) thereof. In some embodiments, formulations comprising a hydrocarbon solvent and a composition according to the present invention further comprise at least one gas (i.e., the formulation is a foam).

Typically, formulations (e.g., foams) according to and/or prepared by the present invention include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight of at least one composition according to the present invention, based on the total weight of the formulation. For example, the amount of a composition according to the present invention in a foam may be in a range of from 0.01 to 10, 0.1 to 10, 0.1 to 5, 1 to 10, or even in a range from 1 to 5 percent by weight, based on the total weight of the formulation. In some embodiments, a composition according to the present invention is present in a range from 0.3 to 0.5 percent by weight, based on the total weight of the formulation. Lower and higher amounts of the composition in the formulation (e.g., a foam) may also be used, and may be desirable for some applications.

Forming gas bubbles (e.g., nitrogen, carbon dioxide, and air) in a formulation comprising a liquid and a composition according to the present invention can be carried out using a variety of mechanisms (e.g., mechanical and chemical mechanisms). Useful mechanical foaming mechanisms include agitating (e.g., shaking, stirring, and whipping) the formulation, injecting gas into the formulation (e.g., inserting a nozzle beneath the surface of the composition and blowing gas into the formulation) and combinations thereof. Useful chemical foaming mechanisms include producing gas in situ through a chemical reaction, decomposition of a component of the composition (e.g., a component that liberates gas upon thermal decomposition), evaporating a component of the formulation (e.g., a liquid gas, and volatilizing a gas in the composition by decreasing the pressure on the formulation or heating the formulation). Foams according to and/or prepared by methods according to the present invention comprise gas bubbles at volume fractions ranging from 10% to 90% of the total foam volume.

Compositions according to the present invention may be useful additives, for example, in foams for delivering oil- and/or water-repellent treatments to substrates (including fibrous substrates, e.g., textile, non-woven, carpet, and leather). The compositions can also be applied as oil- and/or water-repellent treatment using other conventional application methods. Methods for treating substrates with fluorinated polymers as well as solvents and additives useful in formulations of oil- and/or water-repellent treatments are known in the art (see, e.g., U.S. Pat. App. Pub. No. 2005/0027063 (Audenaert et al.), the disclosure of which is incorporated herein by reference. Useful amounts of compositions according to the present invention that can provide repellency to a substrate typically range from 0.01% to 10% (in some embodiments, 0.05% to 3.0% or even 0.1 to 1.0%) by weight, based on the weight of the substrate.

Methods of treating a surface according to the present invention can also be carried out as described in U.S. Pat. No. 6,689,854 (Fan et al.) and U.S. Pat. App. Pub. No. 2006/0045979 (Dams), the disclosures of which, relating to methods of treating surfaces and formulations for treating surfaces, are incorporated herein by reference.

In any of the aforementioned embodiments of compositions according to and/or useful in practicing the present invention (e.g., coating or cleaning solution formulations and foams), compositions according to the present invention can be used individually or in combination with a non-fluorinated surfactant (e.g., a hydrocarbon or silicone surfactant) to produce the desired surface tension reduction or wetting improvement. Useful auxiliary surfactants may be found, for example, in Industrial Applications Of Surfactants, D. R. Karsa, Ed., Royal Society of Chemistry, London, and M. Rosen, Surfactants and Interfacial Phenomena, Wiley-Interscience, New York.

Embodiments of this invention are further illustrated by the following non-limiting examples, but the particular materials and amounts thereof recited in these examples, as well as other conditions and, details, should not be construed to unduly limit this invention.

EXAMPLES

In the following examples, all reagents were obtained from Sigma-Aldrich, St. Louis, Mo. unless indicated otherwise. All percentages and ratios reported are by weight unless indicated otherwise.

Preparation of Fluorinated Alcohols and Acrylates

Preparation 1: $CF_3OCF_2OCF_2OCF_2OCF_2C(O)$
$NHCH_2CH_2OC(O)CH=CH_2$

Part A

The methyl ester of perfluoro-3,5,7,9-tetraoxadecanoic acid was prepared according to the method described in U.S. Pat. App. Pub. No. 2007/0015864 (Hintzer et al.) in the Preparation of Compound 1, the disclosure of which preparation is incorporated herein by reference.

Part B

The methyl ester from Part A was treated with ethanolamine according to the method described on column 16, lines 37-62 of U.S. Pat. No. 7,094,829 (Audenaert et al.), the disclosure of which method is incorporated herein by reference.

Part C

In a three-necked 500-mL flask fitted with a stirrer, thermometer and condenser were placed 0.1 mole of the material from Part B, 60 grams methyl ethyl ketone (MEK), 60 grams of a hydrofluoroether obtained from 3M Company, St. Paul, Minn. under the trade designation "HFE-7200", 0.1 mole (10.1 grams) of triethylamine, 0.01 grams hydroquinone monomethyl ether (MEHQ) and 0.01 grams phenothazine. The mixture was cooled to about 5° C. in an ice bath. Then 0.11 mole acryloylchloride (10.1 grams) was added dropwise over about 1 hour under nitrogen. An exothermic reaction was noticed, and precipitate formed. The temperature was allowed to rise to 25° C. over a period of about 1 hour while the reaction mixture was stirred. The stirring was continued for 1 hour under nitrogen at 50° C. The resulting reaction mixture was washed 3 times with 200 mL of water and the organic layer was separated off. All solvents were distilled of at 50° C. under vacuum. A clear, yellow-brown liquid was obtained, which was identified to be $CF_3OCF_2OCF_2OCF_2OCF_2C(O)NHCH_2CH_2OC(O)CH=CH_2$ using nuclear magnetic resonance spectroscopy.

Preparation 2: $CF_3OCF_2CF_2CF_2OCF_2C(O)$
$NHCH_2CH_2OC(O)CH=CH_2$

The methyl ester of perfluoro-3,7-dioxaoctanoic acid (obtained from Anles Ltd., St. Petersburg, Russia) was prepared by esterification and then treated with ethanolamine as described in Part B of Preparation 1. The resulting alcohol was treated according to the method of Part C of Preparation 1 (above) to provide $CF_3OCF_2CF_2CF_2OCF_2C(O)NHCH_2CH_2OC(O)CH=CH_2$.

Preparation 3: $CF_3OCF_2CF_2CF_2OCHFCF_2C(O)$
$NHCH_2CH_2OC(O)CH=CH_2$

The methyl ester of 3-H-perfluoro-4,8-dioxanonanoic acid $(CF_3O(CF_2)_3OCHFCF_2COOCH_3)$ was prepared according to the method described in the synthesis of compound 2 in U.S. Pat. App. Pub. No. 2007/0142541 (Hintzer et al.); the disclosure of this synthesis is incorporated herein by reference. The methyl ester was then treated with ethanolamine as described in Part B of Preparation 1. The resulting alcohol was treated according to the method of Part C of Preparation 1 (above) to provide the title compound.

Preparation 4: $CF_3OCF_2CF_2CF_2OCHFCF_2C(O)$
$NHCH_2CH_2OC(O)C(CH_3)=CH_2$

The methyl ester of 3-H-perfluoro-4,8-dioxanonanoic acid $(CF_3O(CF_2)_3OCHFCF_2COOCH_3)$, prepared in Preparation 3 (above) was treated with ethanolamine as described in Part B of Preparation 1. The resulting alcohol was treated according to the method of Part C of Preparation 1 (above) except using 0.11 mole methacryloylchloride instead of 0.11 mole of acryloylchloride to provide the title compound.

Preparation 5: $CF_3CF_2CF_2OCHFCF_2C(O)$
$NHCH_2CH_2OC(O)CH=CH_2$

The methyl ester of 3-H-perfluoro-4-oxaheptanoic acid $(C_3F_7OCHFCF_2COOCH_3)$ was prepared according to the method described in the synthesis of compound 4 in U.S. Pat. App. Pub. No. 2007/0142541 (Hintzer et al.); the disclosure of this synthesis is incorporated herein by reference. The methyl ester was then treated with ethanolamine as described in Part B of Preparation 1. The resulting alcohol was treated according to the method of Part C of Preparation 1 (above) to provide the title compound.

Preparation 6: $CF_3CF_2CF_2OCHFCF_2C(O)$
$NHCH_2CH_2OC(O)C(CH_3)=CH_2$

The methyl ester of 3-H-perfluoro-4-oxaheptanoic acid $(C_3F_7OCHFCF_2COOCH_3)$, prepared in Preparation 5 (above) was treated with ethanolamine as described in Part B of Preparation 1. The resulting alcohol was treated according to the method of Part C of Preparation 1 (above) except using 0.11 mole methacryloylchloride instead of 0.11 mole of acryloylchloride to provide the title compound.

Example 1

In a three-necked 100-mL flask fitted with a thermometer, stirrer, condenser and heating mantle, were placed 3 grams Preparation 2 acrylate, 14 grams of a 50% solution of the monoacrylate of a block copolymer of ethylene oxide and propylene oxide (obtained from BASF Corporation, Ludwigshafen, Germany, under the trade designation "PLURONIC L44") in toluene, 3 grams "HFE-7200" hydrofluoroether, 0.5 gram of 3-mercapto-1,2-propanediol, and 0.05 gram 2,2'-azobis(2-methylpropionitrile) (AIBN). The reaction mixture was degassed 3 times using nitrogen and aspirator vacuum and then heated to 75° C. for 6 hours. Another charge of 0.02 gram AIBN was added and the reaction was continued for 16 hours at 75° C. under a nitrogen atmosphere. Solvent was then removed at about 80-90° C. and aspirator vacuum. A clear amber, viscous liquid resulted.

The monoacrylate of block copolymer "PLURONIC L44" was prepared according to the method of Example 1 of U.S. Pat. No. 3,787,351 (Olson), which example is incorporated herein by reference, except using a 1:1 molar ratio of acrylic acid and the block copolymer.

Examples 2-9

Examples 2-9 were prepared with the same procedure as Example 1 except using the ingredients listed in Table 1 (below).

TABLE 1

| Example | Fluorinated monomer (amount in grams (g)) | Co-monomers | Solvent | % solids |
|---|---|---|---|---|
| 1 | Preparation 2 (3 g) | Monoacrylate of block copolymer "PLURONIC L44" (7 g) | Toluene/ hydrofluoroether "HFE 7200" | 50% |
| 2 | Preparation 2 (5.5 g) | Acrylate of polyethylene oxide (3.5 g), AA (1 g) | EtOAc | 50% |
| 3 | Preparation 1 (6 g) | ODA (4 g) | EtOAc | 30% |
| 4 | Preparation 1 (3 g) | Monoacrylate of block copolymer "PLURONIC L44" (7 g) | Toluene/ hydrofluoroether "HFE 7200" | 50% |
| 5 | Preparation 3 (3 g) | Monoacrylate of block copolymer "PLURONIC L44" (7 g) | Toluene/ hydrofluoroether "HFE 7200" | 50% |
| 6 | Preparation 5 (3 g) | Monoacrylate of block copolymer "PLURONIC L44" (7 g) | Toluene/ hydrofluoroether "HFE 7200" | 50% |
| 7 | Preparation 4 (6 g) | ODMA (4 g) | EtOAc | 50% |
| 8 | Preparation 2 (6 g) | ODMA (3 g), TMSPMA (1 g) | EtOAc | 50% |
| 9 | Preparation 6 (6 g) | ODMA (4 g) | EtOAc | 50% |
| 10 | Preparation 4 (6 g) | DMAEMA (4 g) Acetic acid (1.6 g) | IPA | 50% |
| 11 | Preparation 4 (6 g) | DMAEMA (4 g) Propanesultone (3.2 g) | IPA | 50% |
| 12 | Preparation 4 (6 g) | DMAEMA (4 g) Hydrogen peroxide (2.9 g, 30% in water) | IPA | 50% |

EtOAc is ethyl acetate.
IPA is isopropanol.
The acrylate of polyethylene oxide was preparation from a monofunctional methoxypolyethyleneglycol with a molecular weight of 750 grams per mole obtained from Dow Chemical, Midland, MI, under the trade designation "CARBOWAX 750".
AA is acrylic acid.
ODMA is octadecylmethacrylate.
ODA is octadecylacrylate.
TMSPMA is trimethoxysilylpropylmethacrylate.
DMAEMA is dimethylaminoethylmethacrylate.

Examples 10-12

Examples 10-12 were prepared with the same procedure of Example 1 except using the ingredients listed in Table 1 (above) and using the following modification. Instead of removing solvent, the reaction mixture was cooled to 30° C. under nitrogen. The third reagent listed in Table 1 (above) (i.e., acetic acid, propanesultone, or hydrogen peroxide, respectively) was added, and the reaction mixture was heated to 70° C. for 3 hours. Then the clear solution was allowed to cool to room temperature.

Surface Tension Measurement

Examples 1 to 12 were diluted with deionized water (except in those cases where other solvents are specifically mentioned) to the concentrations given in Table 2 (below). Surface tensions were measured for the solutions containing Examples 1 to 12 using a Kruss K-12 tensiometer (obtained from Kruss GmbH, Hamburg, Germany) using the Du Nouy ring method at 20° C. The results are summarized in Table 2 (below).

TABLE 2

| Example | Concentration (ppm) | Surface tension (mN/m) |
|---|---|---|
| 1 | 1000 | 21.5 |
|   | 100 | 22.9 |
| 2 (solvent is TEGME) | 5000 | 19.7 (pure TEGME: 36.1) |
| 3 (solvent is toluene) | 5000 | 21.2 (pure toluene 27.8) |
| 4 | 1000 | 21.2 |
|   | 100 | 21.8 |

TABLE 2-continued

| Example | Concentration (ppm) | Surface tension (mN/m) |
|---|---|---|
| 5 | 1000 | 21.4 |
|   | 100 | 24.7 |
| 6 | 1000 | 22.0 |
|   | 100 | 26.4 |
| 7 (solvent is toluene) | 5000 | 22.4 |
| 8 (solvent is toluene) | 5000 | 21.5 |
| 9 (solvent is toluene) | 5000 | 22.8 |
| 10 | 1000 | 20.1 |
|    | 500 | 24.9 |
|    | 100 | 45.2 |
| 11 | 1000 | 19.8 |
|    | 500 | 22.3 |
|    | 100 | 50.5 |
| 12 | 1000 | 20.2 |
|    | 500 | 22.6 |
|    | 100 | 40.1 |
| Surfactant "FC-4430" | 1000 | 22.5 |
|    | 100 | 26.5 |

TEGME is tetraethyleneglycol methyl ether

For the purposes of comparison, a surfactant was obtained from 3M Company, St. Paul, Minn. under the trade designation "FC-4430", diluted to the concentrations shown in Table 2, and evaluated for surface tension as described above. The results are shown in Table 2 (above).

Example 13

In a three-necked flask, 100-mL flask, fitted with a stirrer, heating mantle, condenser, and thermometer, were placed 4.4 grams Preparation 2 acrylate (0.01 mole), 1.8 gram (0.0054 mole) ODMA, 6.2 grams methyl ethyl ketone (MEK), 0.03 gram octylmercaptan, and 0.01 g AIBN. The reaction mixture was degassed 3 times using nitrogen and aspirator vacuum and then heated to 75° C. for 6 hours. Another charge of 0.01 gram AIBN was added and the reaction was continued for 16 hours at 75° C. under nitrogen atmosphere. A clear, slightly yellow solution resulted.

Example 14

Example 14 was prepared following the procedure of Example 13 except using Preparation 1 acrylate instead of Preparation 2 acrylate.

Example 15

Example 15 was prepared following the procedure of Example 13 except with the following modifications. In a 250-mL flask, a solution polymer was made using 49.5 grams of Preparation 1 acrylate and 0.5 gram acrylic acid in 40 grams of MEK and 10 grams "HFE-7200" hydrofluoroether and using 0.1 gram octylmercaptan. The first and second charges of AIBN were 0.15 gram and 0.05 gram, respectively.

Dynamic Contact Angle on Glass

Dynamic advancing and receding contact angles were measured on flat glass (obtained from Aqua Production, France) using a Kruss DSA 100 (obtained from Kruss GmbH). All samples except Comp Ex 1 were diluted to 20% solids in their corresponding solvents, listed in Table 1. They were applied with a K Hand Coater Bar nr 3 (available from RK Print Coat Ltd, UK) at room temperature, leaving a 24 micron wet film deposited. For the purposes of comparison, a fluorochemical polymeric glass coating was obtained from 3M Company under the trade designation "ECC-4000" and was used as Comparative Example 1 (Comp. Ex. 1). Comp. Ex. 1 was spray applied at 0.1% concentration. The coatings of Examples 7 to 9 were dried at room temperature for 30 minutes, followed by 1 minute at 80° C. The coatings of Examples 13 to 15 were dried at room temperature. The advancing and receding contact angles were measured after 1 hour at room temperature. The results are summarized in Table 3 (below).

TABLE 3

| Fluorochemical material | Advancing/Receding CA with water | Advancing/Receding CA with hexadecane |
| --- | --- | --- |
| Example 7 | 109/92 | 77/63 |
| Example 8 | 118/98 | 76/60 |
| Example 9 | 101/70 | 72/53 |
| Example 13 | 114/96 | 79/64 |
| Example 14 | 112/97 | 78/62 |
| Example 15 | 110/80 | 77/58 |
| Comp. Ex. 1 "ECC-4000" | 113/95 | 71/61 |
| Comp. Ex. 2 | 114/90 | 72/47 |

For the purposes of comparison, an oligomeric fluorochemical silane was prepared as described in paragraphs 148 and 149 of U.S. Pat. App. Pub. No. 20030224112 (Dams) to provide Comparative Example 2 (Comp. Ex. 2), which was applied to glass and evaluated for contact angle. The results are shown in Table 3 (above).

Preparation 7: $CF_3CFH\text{—}O\text{—}(CF_2)_5CH_2OC(O)CH\text{=}CH_2$

Part A $CF_3CFH\text{—}O\text{—}(CF_2)_5COOH$ (426 grams, 1.0 mole), which was prepared according to the method described in Example 3 of U.S. Pat. App. Pub. No. 2007/0276103, was esterified at 65° C. with methanol (200 grams, 6.3 moles) and concentrated sulfuric acid (200 grams, 2.0 moles). The reaction mixture was washed with water and distilled at 172° C. to give 383 grams of $CF_3CFH\text{—}O\text{—}(CF_2)_5COOCH_3$, which was combined with material from another run and used in Part B.

Part B

A 5-L round-bottom flask equipped with a mechanical stirrer and nitrogen bubbler was charged with 1 L of glyme, sodium borohydride (76 grams, 2.0 moles) and heated to 80° C. $CF_3CFH\text{—}O\text{—}(CF_2)_5COOCH_3$ (713 grams, 1.67 mole), prepared as described in Part A, was added to the stirred slurry over a period of one hour. A mixture of concentrated sulfuric acid (198 grams) and water (1.0 L) was added to the reaction mixture. The lower phase was separated, and the solvent was removed by distillation. Further distillation provided 506 grams of $CF_3CFH\text{—}O\text{—}(CF_2)_5CH_2OH$ (boiling point 173° C.), the structure of which was confirmed by Fourier Transform Infrared Spectroscopy (FTIR) and $^1H$ and $^{19}F$ Nuclear Magnetic Resonance (NMR) Spectroscopy.

Part C

A 5-L round-bottom flask equipped with a mechanical stirrer and nitrogen bubbler was charged with a portion of the material from Part B (250 grams, 0.63 mole), diisopropylethylamine (90 grams, 0.7 mole), and 200 grams tent-butyl methyl ether and heated at 55° C. for 30 minutes. Acryloyl chloride (61 grams, 0.67 mole) was added over a period of 30 minutes. During the addition, a slight reflux was maintained, and a precipitate formed. Water (15 grams), magnesium sulfate (16 grams), potassium carbonate (16 grams), and silica gel (90 grams) were added, and the resulting mixture was stirred for 15 minutes, vacuum filtered, and concentrated at 50° C./0.1 mmHg (13 Pa) to provide 250 grams (0.55 mole) of $CF_3CFH\text{—}O\text{—}(CF_2)_5CH_2OC(O)CH\text{=}CH_2$, the structure of which was confirmed by FTIR and $^1H$ and $^{19}F$ NMR Spectroscopy.

Example 16

Under a nitrogen atmosphere, (1% by weight) 2,2'-azobis (2-methylbutyronitrile) (obtained from E. I. DuPont de Nemours & Co., Wilmington, Del., under the trade designation "VAZO 67") was added to a 35% solution by weight of $CF_3CFH\text{—}O\text{—}(CF_2)_5CH_2OC(O)CH\text{=}CH_2$ in ethyl acetate. The reaction was heated at 70 to 75° C. for 24 hours.

Example 17

The method of Example 16 was followed except an 80/20 weight ratio of $CF_3CFH\text{—}O\text{—}(CF_2)_5CH_2OC(O)CH\text{=}CH_2$ and ODA was copolymerized.

Example 18

The method of Example 16 was followed except a 4:1 ratio of $CF_3CFH\text{—}O\text{—}(CF_2)_5CH_2OC(O)CH\text{=}CH_2$ to 2-mercaptoethanol was used. The reaction was carried out at 44% solids by weight.

Dynamic Contact Angle Measurement for Examples 16 to 18

Nylon 66 film (obtained from E. I. DuPont de Nemours & Co.) was cut into strips, and the strips were cleaned with methyl alcohol. Using a smaller binder clip to hold one end of the nylon film, the strip was immersed in a treating solution (about 5% solids) and withdrawn slowly from the solution.

The coated strip was allowed to air dry undisturbed for a minimum of 30 minutes and then was heated for 10 minutes at 150° C.

Advancing and receding contact angles on the coated film were measured using a CAHN Dynamic Contact Angle Analyzer, Model DCA 322 (a Wilhelmy balance apparatus equipped with a computer for control and data processing, obtained from ATI, Madison, Wis.). Water and hexadecane were used as probe liquids, and the average of 3 measurements are reported in Table 4, below.

TABLE 4

| Fluorochemical material | Advancing/Receding CA with water | Advancing/Receding CA with hexadecane |
|---|---|---|
| Example 16 | 117/51 | 87/34 |
| Example 17 | 110/57 | 65/23 |
| Example 18 | 93/73 | 76/30 |
| Example 19 | 75/47 | 78/10 |

Preparation 8: $CF_3$—CFH—O—$(CF_2)_3$—$CH_2$—OC(O)CH=$CH_2$

Part A

The method for the Preparation of $CF_3$—CFH—O—$(CF_2)_5$—$CH_2$—OC(O)CH=$CH_2$, Part B was followed except 200 grams (0.6 mole) of $CF_3$—CFH—O—$(CF_2)_3$—C(O)O—$CH_3$ was reduced with 30 grams (0.79 mole) of sodium borohydride in 0.2 L of glyme. At the end of the reaction 150 grams of sulfuric acid in 0.3 L of water was added, and 115 grams of $CF_3$—CFH—O—$(CF_2)_3$—$CH_2$—OH, having a boiling point of 130° C., were obtained.

Part C

The method for the Preparation of $CF_3$—CFH—O—$(CF_2)_5$—$CH_2$—OC(O)CH=$CH_2$, Part B was followed except 50 grams (0.17 mole) of $CF_3$—CFH—O—$(CF_2)_3$—$CH_2$—OH was used instead of $CF_3$—CFH—O—$(CF_2)_5$—$CH_2$—OH. The reaction with acryloyl chloride (18.2 grams, 0.2 mole) was carried out in glyme (75 grams) in the presence of diisopropylethylamine (26 grams, 0.2 mole), and the reaction mixture was heated at 45° C. for 30 minutes. After this time, water (100 grams) and a hydrofluoroether (50 grams) obtained from 3M Company, St. Paul, Minn. under the trade designation "FLOURINERT 77" was added. The lower phase was separated, dried with magnesium sulfate, filtered, and distilled at 42° C. at 0.1 mmHg (13 Pa) to provide 18.5 grams $CF_3$—CFH—O—$(CF_2)_3$—$CH_2$—OC(O)CH=$CH_2$.

Example 19

$CF_3$—CFH—O—$(CF_2)_3$—$CH_2$—OC(O)CH=$CH_2$ (60 grams), poly(ethylene glycol) diacrylate having a number average molecular weight of 700 grams per mole (PEGDA-700) (32 grams), and $HSCH_2CH_2OCH_2CH_2OCH_2CH_2SH$ (8 grams) were combined in ethyl acetate at about 30% by weight solids. Nitrogen was bubbled through the solution for one minute, and 2,2'-azobis(2-methylbutyronitrile) (obtained from E. I. DuPont de Nemours & Co. under the trade designation "VAZO-67") was added at 1% by weight. The reaction mixture was heated at about 70° C. for about 24 hours. A sample of the mixture was then diluted to about 5% by weight solids with ethyl acetate, and the procedure for Dynamic Contact Angle Measurement for Examples 16 to 18 was followed. The results are shown in Table 4, above. The ethyl acetate was removed under reduced pressure, and the residue was dissolved in 50/50 isopropanol/water at 2% by weight for surface tension measurements.

Examples 20 to 23

The method described in Example 19 was followed except using $CF_3$—CFH—O—$(CF_2)_5$—$CH_2$—OC(O)CH=$CH_2$ instead of $CF_3$—CFH—O—$(CF_2)_3$—$CH_2$—OC(O)CH=$CH_2$ and using the reagents and molar equivalents shown in Table 5, below. MePEGA is poly(ethylene glycol) methyl ether methacrylate having a number average molecular weight of about 454. PEGDS-1598 is $HSCH_2C(O)$—O—$(CH_2CH_2O)_n C(O)CH_2SH$, prepared as described below. For Example 23, about 1.2 equivalents of hydrogen peroxide were included in the polymerization reaction. For each Example, the ethyl acetate was removed at the end of the reaction time under reduced pressure, and the residue was dissolved in 50/50 isopropanol/water at 2% by weight for surface tension measurements.

$HSCH_2C(O)$—O—$(CH_2CH_2O)_n C(O)CH_2SH$ was prepared using the following method. In a 250-mL three-neck flask, 14.50 grams (10 millimoles (mmol)) of polyethylene glycol having a number average molecular weight of about 1450 grams per mole, 1.84 grams (20 mmol) mercaptoacetic acid, 100 grams toluene and 2 drops of $CF_3SO_3H$ catalyst were added. The mixture was heated at reflux under nitrogen for 6 hours while removing the formed water using a Dean-Stark trap and then cooled to room temperature. At room temperature, 1 gram of CaO was added, and the solution was heated to 70° C. for 1 hour, followed by filtration to remove $CF_3SO_3H$. Rotary evaporation of the filtrated solution to give a wax solid, which was dried overnight under vacuum to provide 16.08 grams of product.

TABLE 5

| Example | $CF_3$—CFH—O—$(CF_2)_5$—$CH_2$—OC(O)CH=$CH_2$, molar equivalents | Monomer 2, molar equivalents | Monomer 3, molar equivalents |
|---|---|---|---|
| 20 | 4 | PEGDA-700, 1 | $HSCH_2CH_2OCH_2CH_2OCH_2CH_2SH$, 1 |
| 21 | 6 | PEGDA-700, 1 | PEGDS-1598, 1 |
| 22 | 6 | MePEGA, 2 | $HSCH_2CH_2OCH_2CH_2OCH_2CH_2SH$, 1 |
| 23 | 6 | PEGDA-700, 1 and MePEGA, 2 | $HSCH_2CH_2OCH_2CH_2OCH_2CH_2SH$, 1 |

Surface tension was determined for Examples 19 to 23 using a Kruss K12 Tensiometer, purchased from Kruss USA, Charlotte, N.C. For each Example the 2% solution in isopropanol/water was added dropwise to water, and the surface tension of the resulting solution was measured at room temperature. The results are shown in Table 6, below.

TABLE 6

| Example | Concentration (ppm) | Surface tension (mN/m) |
|---|---|---|
| 19 | 1400 | 21.2 |
|    | 71 | 23 |
| 20 | 1400 | 21.5 |
|    | 71 | 21.5 |
| 21 | 1400 | 20.9 |
|    | 71 | 25.7 |
| 22 | 1400 | 24.2 |
|    | 71 | 27.18 |
| 23 | 1400 | 22.6 |
|    | 71 | 26.4 |

Various modifications and alterations of this invention may be made by those skilled in the art without departing from the scope and spirit of this invention, and it should be understood that this invention is not to be unduly limited to the illustrative embodiments set forth herein.

What is claimed is:

1. A polymer or oligomer comprising at least one first divalent unit represented by formula:

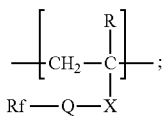

wherein
each Rf is independently selected from the group consisting of:

$Rf^a$—(O)$_t$—CHF—(CF$_2$)$_n$—;

[$Rf^a$—(O)$_t$—C(L)H—CF$_2$—O]$_m$—W—;

CF$_3$CFH—O—(CF$_2$)$_p$—;

and

CF$_3$—O—(CF$_2$)$_3$—(OCF(CF$_3$)—CF$_2$)$_z$—O-L$^1$-;

each Q is independently selected from the group consisting of a bond, —C(O)—N(R$^1$)—, and —C(O)—O—;
each X is independently selected from the group consisting of alkylene and arylalkylene, wherein alkylene and arylalkylene are each optionally interrupted by at least one ether linkage and optionally terminated by —N(R$^1$)—C(O)— or —O—C(O)—;
R and R$^1$ are each independently selected from the group consisting of hydrogen and alkyl having from 1 to 4 carbon atoms;
Rf$^a$ represents a partially or fully fluorinated alkyl group having from 1 to 10 carbon atoms and optionally interrupted with at least one oxygen atom;
L is selected from the group consisting of F and CF$_3$;
W is selected from the group consisting of alkylene and arylene;
L$^1$ is selected from the group consisting of —CF$_2$—, —CF$_2$CF$_2$—, and —CF(CF$_3$)—;
t is 0 or 1, wherein when Rf is represented by formula Rf$^a$—(O)$_t$—CHF—(CF$_2$)$_n$— and t is 0, then Rf$^a$ is interrupted with at least one oxygen atom;
m is 1, 2, or 3;
n is 0 or 1;
each p is independently an integer from 1 to 6; and
z is an integer from 0 to 3.

2. The polymer or oligomer according to claim 1, wherein each Rf is independently selected from the group consisting of:

$Rf^a$—(O)$_t$—CHF—(CF$_2$)$_n$—; and

[$Rf^a$—(O)$_t$—C(L)H—CF$_2$—O]$_m$—W—.

3. The polymer or oligomer according to claim 1, wherein t is 1, and wherein Rf$^a$ is selected from the group consisting of:
fully fluorinated alkyl groups having from 1 to 6 carbon atoms; and
fully fluorinated groups represented by formula:

$R_f^1$—[O$R_f^2$]$_x$—[O$R_f^3$]$_y$—, wherein
$R_f^1$ is a perfluorinated alkyl group having from 1 to 6 carbon atoms;
$R_f^2$ and $R_f^3$ are each independently perfluorinated alkylene having from 1 to 4 carbon atoms; and
x and y are each independently an integer having a value from 0 to 4, wherein the sum of x and y is at least 1.

4. The polymer or oligomer according to claim 1, wherein t is 0, and wherein Rf$^a$ is a fully fluorinated group represented by formula:

$R_f^4$—[O$R_f^5$]$_a$—[O$R_f^6$]$_b$—O—CF2—, wherein
$R_f^4$ is a perfluorinated alkyl group having from 1 to 6 carbon atoms;
$R_f^5$ and $R_f^6$ are each independently perfluorinated alkylene having from 1 to 4 carbon atoms; and
a and b are each independently integers having a value from 0 to 4.

5. The polymer or oligomer according to claim 1, wherein Rf is selected from the group consisting of:

C$_3$F$_7$—O—CHF—;

CF$_3$—O—CF$_2$CF$_2$—CF$_2$—O—CHF—;

CF$_3$CF$_2$CF$_2$—O—CF$_2$CF$_2$—CF$_2$—O—CHF—;

CF$_3$—O—CF$_2$—CF$_2$—O—CHF—;

CF$_3$—O—CF$_2$—O—CF$_2$—CF$_2$—O—CHF—;

CF$_3$—(O—CF$_2$)$_2$—O—CF$_2$—CF$_2$—O—CHF—;

CF$_3$—(O—CF$_2$)$_3$—O—CF$_2$—CF$_2$—O—CHF—;

CF$_3$—O—CHF—CF$_2$—;

CF$_3$—O—CF$_2$—CF$_2$—O—CHF—CF$_2$—;

CF$_3$—CF$_2$—O—CHF—CF$_2$—;

CF$_3$—O—CF$_2$—CF$_2$—CF$_2$—O—CHF—CF$_2$—;

CF$_3$—O—CF$_2$—O—CF$_2$—CF$_2$—O—CHF—CF$_2$—;

CF$_3$—(O—CF$_2$)$_2$—O—CF$_2$—CF$_2$—O—CHF—CF$_2$—;

CF$_3$—(O—CF$_2$)$_3$—O—CF$_2$—CF$_2$—O—CHF—CF$_2$—;

CF$_3$—O—CF$_2$—CHF—;

C$_3$F$_7$—O—CF$_2$—CHF—;

$CF_3-O-CF_2-CF_2-CF_2-O-CF_2-CHF-$;

$CF_3-O-CF_2-O-CF_2-CF_2-O-CF_2-CHF-$;

$CF_3-(O-CF_2)_2-O-CF_2-CF_2-O-CF_2-CHF-$;

$CF_3-(O-CF_2)_3-O-CF_2-CF_2-O-CF_2-CHF-$;

$CF_3-O-CF_2-CHF-CF_2-$;

$C_2F_5-O-CF_2-CHF-CF_2-$;

$C_3F_7-O-CF_2-CHF-CF_2-$;

$CF_3-O-CF_2-CF_2-CF_2-O-CF_2-CHF-CF_2-$;

$CF_3-O-CF_2-O-CF_2-CF_2-O-CF_2-CHF-CF_2-$;

$CF_3-(O-CF_2)_2-O-CF_2-CF_2-O-CF_2-CHF-CF_2-$; and $CF_3-(O-CF_2)_3-O-CF_2-CF_2-O-CF_2-CHF-CF_2-$.

6. The polymer or oligomer according to claim 1, wherein Rf is $CF_3CFH-O-(CF_2)_p-$.

7. The polymer or oligomer according to claim 1, wherein Rf is $CF_3-O-(CF_2)_3-O-L^1-$, wherein $L^1$ is selected from the group consisting of $-CF_2-$ and $-CF_2CF_2-$.

8. The polymer or oligomer according to claim 1, wherein each first divalent unit is represented by formula:

$$Rf-C(O)-N(R^1)-X^1-O-\overset{\displaystyle \left[CH_2-\underset{\underset{\displaystyle }{\displaystyle }}{\overset{\displaystyle R}{C}}\right]}{C}=O,$$

wherein each $X^1$ is independently selected from the group consisting of alkylene and arylalkylene, and wherein alkylene and arylalkylene are each optionally interrupted by at least one ether linkage.

9. The polymer or oligomer according to claim 1, further comprising at least one divalent unit represented by formula:

$$\left[CH_2-\underset{\underset{\displaystyle R^3-O-C=O}{\displaystyle }}{\overset{\displaystyle R^2}{C}}\right]$$

wherein
each $R^2$ is independently selected from the group consisting of hydrogen and alkyl having from 1 to 4 carbon atoms; and
each $R^3$ is independently alkyl having from 1 to 30 carbon atoms.

10. The polymer or oligomer according to claim 1, further comprising a polyalkyleneoxy segment.

11. The polymer or oligomer according to claim 10, wherein the polymer or oligomer comprises at least one ether-containing divalent unit represented by formula:

$$HO-(EO)_r-(PO)_q-(EO)_r-\overset{\displaystyle \left[CH_2-\overset{\displaystyle R^5}{\underset{\displaystyle }{C}}\right]}{C}=O;$$

$$HO-(PO)_q-(EO)_r-(PO)_q-\overset{\displaystyle \left[CH_2-\overset{\displaystyle R^5}{\underset{\displaystyle }{C}}\right]}{C}=O; \text{ or}$$

$$R_4O-(EO)_r-\overset{\displaystyle \left[CH_2-\overset{\displaystyle R^5}{\underset{\displaystyle }{C}}\right]}{C}=O;$$

wherein
$R_4$ and $R_5$ are each independently hydrogen or alkyl of 1 to 4 carbon atoms;
EO represents $-CH_2CH_2O-$;
each PO independently represents $-CH(CH_3)CH_2O-$ or $-CH_2CH(CH_3)O-$;
each r is independently an integer from 2 to 128; and
each q is independently an integer from 0 to 55.

12. The polymer or oligomer according to claim 10, wherein the polyalkyleneoxy segment is present in units represented by formula:

$$\left[\overset{\displaystyle R^5}{\underset{\displaystyle }{C}}-CH_2\right]-\overset{\displaystyle }{\underset{\displaystyle O=C-O-(EO)_r-(PO)_q-(EO)_r-C=O}{}};\left[CH_2-\overset{\displaystyle R^5}{\underset{\displaystyle }{C}}\right]$$

$$\left[\overset{\displaystyle R^5}{\underset{\displaystyle }{C}}-CH_2\right]-\overset{\displaystyle }{\underset{\displaystyle O=C-O-(PO)_q-(EO)_r-(PO)_q-C=O}{}};\left[CH_2-\overset{\displaystyle R^5}{\underset{\displaystyle }{C}}\right]$$

$-S(O)_{0-2}-C_sH_{2s}-C(O)-O-(EO)_r-(PO)_q-(EO)_r-C(O)-C_sH_{2s}-S(O)_{0-2}-$; or $-S(O)_{0-2}-C_sH_{2s}-C(O)-O-(PO)_q-(EO)_r-(PO)_q-C(O)-C_sH_{2s}-S(O)_{0-2}-$, wherein
each $R_5$ is independently hydrogen or alkyl of 1 to 4 carbon atoms;
EO represents $-CH_2CH_2O-$;
each PO independently represents $-CH(CH_3)CH_2O-$ or $-CH_2CH(CH_3)O-$;
each r is independently an integer from 2 to 128;
each q is independently an integer from 0 to 55; and
each s is independently an integer from 1 to 5.

13. A formulation comprising at least one of water or a water-miscible solvent and a polymer or oligomer according to claim 10.

14. A method of making a foam, the method comprising combining components comprising water, a gas, and a polymer or oligomer according to claim 10 to provide the foam.

15. The polymer or oligomer according to claim 1, further comprising at least one anionic divalent unit represented by formula:

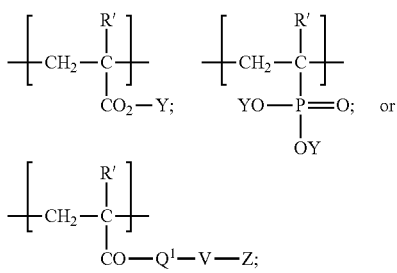

wherein
- $Q^1$ is selected from the group consisting of —O—, —S—, and —N($R^1$)—;
- R' and $R^1$ are each independently selected from the group consisting of hydrogen and alkyl having from 1 to 4 carbon atoms;
- V is alkylene that is optionally interrupted by at least one ether linkage or amine linkage;
- each Y is independently selected from the group consisting of hydrogen and a counter cation; and
- Z is selected from the group consisting of —P(O)(OY)$_2$, —O—P(O)(OY)$_2$, —SO$_3$Y, and CO$_2$Y.

16. The polymer or oligomer according to claim 1, further comprising at least one divalent unit represented by formula:

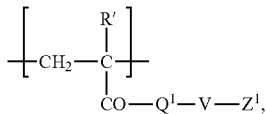

wherein
- $Q^1$ is selected from the group consisting of —O—, —S—, and —N($R^1$)—;
- R' and $R^1$ are each independently selected from the group consisting of hydrogen and alkyl having from 1 to 4 carbon atoms;
- V is alkylene that is optionally interrupted by at least one ether linkage or amine linkage; and
- $Z^1$ is selected from the group consisting of —[N($R^8$)$_3$]$^+$ M$^-$, —N$^+$(OY$^1$)($R^9$)$_3$, —N$^+$($R^8$)$_2$—(CH$_2$)$_g$—SO$_3$Y$^1$, and —N$^{+(R8)}{}_2$—(CH$_2$)$_g$—CO$_2$Y$^1$, wherein
- each $R^8$ is independently selected from the group consisting of hydrogen and alkyl having from 1 to 6 carbon atoms;
- each $R^9$ is independently selected from the group consisting of hydrogen and alkyl having from 1 to 6 carbon atoms, wherein alkyl is optionally substituted by at least one halogen, alkoxy, nitro, or nitrile group, or two $R^9$ groups may join to form a 5 to 7-membered ring optionally containing at least one O, N, or S and optionally substituted by alkyl having 1 to 6 carbon atoms;
- each g is independently an integer from 2 to 6;
- M$^-$ is a counter anion; and
- $Y^1$ is selected from the group consisting of hydrogen and a free anion.

17. The polymer or oligomer according to claim 1, further comprising at least one divalent unit represented by formula:

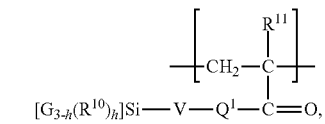

wherein
- each $R^{10}$ is independently selected from the group consisting of alkyl having from 1 to 6 carbon atoms and aryl;
- $Q^1$ is selected from the group consisting of —O—, —S—, and —N($R^1$)—;
- $R^1$ and $R^{11}$ are each independently selected from the group consisting of hydrogen and alkyl having from 1 to 4 carbon atoms;
- V is alkylene that is optionally interrupted by at least one ether linkage or amine linkage;
- each G is independently selected from the group consisting of hydroxyl, alkoxy, acyloxy, and halogen; and
- h is 0, 1, or 2.

18. A method of treating a surface, the method comprising contacting the surface with a composition comprising a polymer or oligomer according to claim 1.

19. The method according to claim 18, wherein the composition further comprises water and a non-fluorinated polymer.

20. A method of reducing the surface tension of a liquid, the method comprising combining the liquid with an amount of a polymer or oligomer according to claim 1, wherein the amount of the polymer or oligomer is sufficient to reduce the surface tension of the liquid.

* * * * *